(12) United States Patent
Pelz et al.

(10) Patent No.: US 12,151,767 B2
(45) Date of Patent: Nov. 26, 2024

(54) TWO-WHEELED VEHICLE

(71) Applicant: Indian Motorcycle International, LLC, Medina, MN (US)

(72) Inventors: Martin Pelz, Bern (CH); Matthias Botta, Biel (CH); Scott M. Schwintek, St. Anthony, MN (US); Michael Keller, Bern (CH); Jason A. Warns, Blaine, MN (US); Severin Hefti, Bern (CH)

(73) Assignee: Indian Motorcycle International, LLC, Medina, MN (US)

( * ) Notice: Subject to any disclaimer, the term of this patent is extended or adjusted under 35 U.S.C. 154(b) by 0 days.

(21) Appl. No.: 18/514,978

(22) Filed: Nov. 20, 2023

(65) Prior Publication Data

US 2024/0083539 A1  Mar. 14, 2024

Related U.S. Application Data

(60) Continuation of application No. 17/228,989, filed on Apr. 13, 2021, now Pat. No. 11,873,054, which is a (Continued)

(51) Int. Cl.
*B62K 11/04* (2006.01)
*B62J 17/04* (2006.01)
*B62K 19/20* (2006.01)

(52) U.S. Cl.
CPC .............. *B62K 11/04* (2013.01); *B62J 17/04* (2013.01); *B62K 19/20* (2013.01)

(58) Field of Classification Search
CPC ...................................................... B62J 17/04
See application file for complete search history.

(56) References Cited

U.S. PATENT DOCUMENTS

| 3,926,274 A | 12/1975 | Morioka et al. |
| 4,168,098 A | 9/1979 | Willey |

(Continued)

FOREIGN PATENT DOCUMENTS

| AU | 03544/55 S | 3/2014 |
| AU | 03546/39 S | 3/2014 |

(Continued)

OTHER PUBLICATIONS

Chinese Office Action issued by the State Intellectual Property Office, dated Sep. 18, 2020, for Chinese Patent Application No. 201880024318.X; 9 pages.

(Continued)

*Primary Examiner* — Kevin Hurley
(74) *Attorney, Agent, or Firm* — Faegre Drinker Biddle & Reath LLP

(57) ABSTRACT

A two-wheeled vehicle includes a frame assembly having a front end and a rear end extending along a longitudinally-extending centerline, a front ground-engaging member operably coupled to the front end of the frame assembly at a front rotational axis, and a rear ground-engaging member operably coupled to the rear end of the frame assembly at a rear rotational axis. The vehicle further includes an engine supported by the frame assembly and operably coupled to the front and rear ground-engaging members, and the engine includes a throttle body assembly. Additionally, the vehicle includes an air intake assembly fluidly coupled to the engine and including an airbox and a mounting plate having a first channel and a second channel. The first and second channels are configured to align with the throttle body assembly. The mounting plate is configured to couple the airbox to the throttle body assembly.

13 Claims, 25 Drawing Sheets

Related U.S. Application Data division of application No. 16/146,249, filed on Sep. 28, 2018, now Pat. No. 11,077,910.

(56) References Cited

U.S. PATENT DOCUMENTS

| | | | |
|---|---|---|---|
| 4,638,881 A | 1/1987 | Morioka et al. |
| 4,813,511 A | 3/1989 | Yamaguchi et al. |
| 5,299,832 A | 4/1994 | Price, Sr. |
| 5,658,035 A | 8/1997 | Armstrong |
| D403,277 S | 12/1998 | Kokubu et al. |
| 5,853,217 A | 12/1998 | Armstrong |
| 5,857,727 A | 1/1999 | Vetter |
| 5,876,013 A | 3/1999 | Ott |
| 6,293,606 B1 | 9/2001 | Jarosz et al. |
| D496,309 S | 9/2004 | Fukumoto et al. |
| 6,877,788 B2 | 4/2005 | Graham |
| D504,844 S | 5/2005 | Sasanami |
| D548,649 S | 8/2007 | Heinrich et al. |
| D549,137 S | 8/2007 | Heinrich et al. |
| D551,129 S | 9/2007 | Takeda |
| D567,717 S | 4/2008 | Hishiki |
| 7,438,149 B2 | 10/2008 | Ishida et al. |
| D581,839 S | 12/2008 | Sasanami |
| D582,316 S | 12/2008 | Stenegard et al. |
| D582,320 S | 12/2008 | Tanaka et al. |
| D588,961 S | 3/2009 | Tanaka et al. |
| D591,204 S | 4/2009 | Matsuzawa |
| D591,205 S | 4/2009 | Heinrich et al. |
| D594,786 S | 6/2009 | Sakata |
| D596,082 S | 7/2009 | Ueno et al. |
| D597,449 S | 8/2009 | Nagao |
| D601,458 S | 10/2009 | Nagao |
| D605,089 S | 12/2009 | Tanaka et al. |
| D605,090 S | 12/2009 | Tanaka et al. |
| D606,457 S | 12/2009 | Tanaka et al. |
| 7,661,714 B2 | 2/2010 | Kubota |
| D611,390 S | 3/2010 | Toriyama et al. |
| 7,712,786 B2 | 5/2010 | Koike |
| D638,756 S | 5/2011 | Kouchi et al. |
| 7,934,741 B1 | 5/2011 | Wright |
| D643,341 S | 8/2011 | Shigeru |
| 8,011,716 B2 * | 9/2011 | Willey ............... B62J 17/04 296/78.1 |
| D647,824 S | 11/2011 | Kouchi et al. |
| D647,825 S | 11/2011 | Shibuta et al. |
| 8,105,406 B2 | 1/2012 | Nishizawa et al. |
| 8,146,693 B2 | 4/2012 | Oohashi et al. |
| 8,156,912 B2 | 4/2012 | Kubo |
| D669,397 S | 10/2012 | Isokari |
| D669,821 S | 10/2012 | Nishihara et al. |
| D670,204 S | 11/2012 | Yasuhara et al. |
| D686,538 S | 7/2013 | Nagao |
| 8,522,141 B2 | 8/2013 | Yoon et al. |
| D688,982 S | 9/2013 | Oyanagi et al. |
| D688,983 S | 9/2013 | Shibuta et al. |
| D689,406 S | 9/2013 | Yasuhara et al. |
| 8,522,741 B2 | 9/2013 | Matsuda et al. |
| D694,673 S | 12/2013 | Katagiri et al. |
| 8,651,551 B2 | 2/2014 | Fukuda et al. |
| 8,807,259 B2 | 8/2014 | Tominaga et al. |
| 8,827,024 B1 | 9/2014 | Sumi et al. |
| 8,839,756 B2 | 9/2014 | Ozaki et al. |
| D718,669 S | 12/2014 | Kiska |
| D723,431 S | 3/2015 | Noguchi et al. |
| 8,985,416 B2 | 3/2015 | Schanz et al. |
| D735,085 S | 7/2015 | Buckan |
| D736,677 S | 8/2015 | Iimura |
| 9,194,278 B2 | 11/2015 | Fronk et al. |
| D744,906 S | 12/2015 | Song et al. |
| 9,255,554 B2 | 2/2016 | Kawata |
| D755,084 S | 5/2016 | Sakata |
| D755,680 S | 5/2016 | Yashuhara et al. |
| D755,681 S | 5/2016 | Martin |
| D755,682 S | 5/2016 | Hahn-Woernle |
| D756,268 S | 5/2016 | Yamada et al. |
| D758,923 S | 6/2016 | Yamada et al. |
| D758,924 S | 6/2016 | Tamura |
| 9,421,860 B2 * | 8/2016 | Schuhmacher ............ B62J 9/00 |
| 9,440,504 B2 | 9/2016 | Bagnariol et al. |
| D795,746 S | 8/2017 | Akita et al. |
| D797,002 S | 9/2017 | Toyama et al. |
| D801,230 S | 10/2017 | Endo |
| 9,803,522 B2 | 10/2017 | Kinoshita et al. |
| 11,077,910 B2 | 8/2021 | Pelz et al. |
| 11,702,166 B2 | 7/2023 | Bagnariol et al. |
| 11,904,867 B2 | 2/2024 | Atsushi et al. |
| 2004/0140686 A1 | 7/2004 | Graham |
| 2005/0051374 A1 | 3/2005 | Nakano et al. |
| 2007/0199754 A1 | 8/2007 | Okuma et al. |
| 2008/0000707 A1 | 1/2008 | Gruber et al. |
| 2008/0169149 A1 | 7/2008 | Holroyd et al. |
| 2008/0190683 A1 | 8/2008 | Hoeve |
| 2008/0308331 A1 | 12/2008 | Trunkenpolz et al. |
| 2008/0314669 A1 | 12/2008 | Buell |
| 2009/0090576 A1 | 4/2009 | Nishizawa et al. |
| 2009/0242313 A1 | 10/2009 | Morita et al. |
| 2009/0322069 A1 | 12/2009 | Koike |
| 2010/0243691 A1 | 9/2010 | Salisbury |
| 2012/0248812 A1 | 10/2012 | Fukuda et al. |
| 2012/0318598 A1 | 12/2012 | Fujiyama et al. |
| 2013/0068812 A1 | 3/2013 | St. Georges |
| 2014/0048347 A1 | 2/2014 | Munzel et al. |
| 2014/0084565 A1 | 3/2014 | Nakamura et al. |
| 2014/0136076 A1 | 5/2014 | Novak et al. |
| 2014/0262580 A1 | 9/2014 | Bagnariol |
| 2014/0360797 A1 | 12/2014 | Kawata |
| 2015/0083513 A1 | 3/2015 | Ito et al. |
| 2015/0090512 A1 | 4/2015 | Inoue et al. |
| 2015/0101875 A1 | 4/2015 | Inayama et al. |
| 2015/0274239 A1 | 10/2015 | Kontani |
| 2015/0275717 A1 | 10/2015 | Kontani et al. |
| 2016/0339754 A1 | 11/2016 | Teachout et al. |
| 2017/0089308 A1 | 3/2017 | Yamashita et al. |
| 2017/0334500 A1 | 11/2017 | Jarek et al. |
| 2018/0257726 A1 | 9/2018 | Bagnariol et al. |
| 2019/0242335 A1 | 8/2019 | Diehl et al. |
| 2020/0102041 A1 | 4/2020 | Pelz et al. |
| 2021/0221460 A1 | 7/2021 | Bagnariol et al. |
| 2021/0229771 A1 | 7/2021 | Pelz et al. |
| 2022/0161884 A1 * | 5/2022 | Kramer .................... B62J 17/00 |
| 2023/0303196 A1 | 9/2023 | Bagnariol et al. |

FOREIGN PATENT DOCUMENTS

| | | | |
|---|---|---|---|
| AU | 03546/47 S | 3/2014 |
| AU | 2014227761 A1 | 10/2015 |
| AU | 2016210752 A1 | 8/2016 |
| AU | 2017225088 A1 | 9/2017 |
| CA | 155479 S | 11/2014 |
| CN | 1245126 A | 2/2000 |
| CN | 1537750 A | 10/2004 |
| CN | 101028846 A | 9/2007 |
| CN | 101618751 A | 1/2010 |
| CN | 102126539 A | 7/2011 |
| CN | 102874344 A | 1/2013 |
| CN | 103502087 A | 1/2014 |
| CN | 303031398 S | 12/2014 |
| CN | 204341290 U | 5/2015 |
| CN | 104781138 A | 7/2015 |
| CN | 105579336 A | 5/2016 |
| CN | 105143028 B | 2/2018 |
| CN | 108100128 A | 6/2018 |
| CN | 108100129 A | 6/2018 |
| EP | 0879755 A2 | 11/1998 |
| EP | 1418119 A2 * | 5/2004 | ............ B62J 17/04 |
| EP | 2045461 A2 | 4/2009 |
| EP | 2045462 A2 | 4/2009 |
| EP | 2141067 A1 | 1/2010 |
| EP | 2835308 A1 | 2/2015 |
| EP | 2969724 A1 | 1/2016 |
| EP | 4100303 B1 * | 2/2024 | ............ B60T 11/16 |
| GB | 2202276 A | 9/1988 |
| JP | 55-068483 A | 3/1980 |
| JP | 56-082677 A | 7/1981 |

(56) References Cited

FOREIGN PATENT DOCUMENTS

| | | | |
|---|---|---|---|
| JP | 58-047220 Y2 | | 10/1983 |
| JP | 61-268579 A | | 11/1986 |
| JP | 62-051196 B2 | | 10/1987 |
| JP | H02031990 A | | 2/1990 |
| JP | 05-310165 A | | 11/1993 |
| JP | 05-310167 A | | 11/1993 |
| JP | H10316068 A | | 12/1998 |
| JP | 11-192988 A | | 7/1999 |
| JP | 3204536 B2 | | 9/2001 |
| JP | 2002-205675 A | | 7/2002 |
| JP | 2006-315465 A | | 11/2006 |
| JP | 2006-347450 A | | 12/2006 |
| JP | 2007-230301 A | | 9/2007 |
| JP | 2007-230351 A | | 9/2007 |
| JP | 2010-030584 A | | 2/2010 |
| JP | 2013-071596 A | | 4/2013 |
| JP | 5310165 B2 | | 10/2013 |
| JP | 2014-238025 A | | 12/2014 |
| JP | 2015-186940 A | | 10/2015 |
| JP | 2016-515971 A | | 6/2016 |
| JP | 2016539839 A | * | 12/2016 |
| JP | 2019-048554 A | | 3/2019 |
| WO | 2014/033953 A1 | | 3/2014 |
| WO | 2014/144224 A1 | | 9/2014 |
| WO | 2018/164998 A1 | | 9/2018 |

OTHER PUBLICATIONS

Communication pursuant to Article 94(3) EPC issued by the European Patent Office, dated Sep. 23, 2020, for European Patent Application No. 18712361.7; 6 pages.

International Preliminary Report on Patentability issued by the European Patent Office, dated May 22, 2019, for International Patent Application No. PCT/US2018/020865; 33 pages.

International Preliminary Report on Patentability issued by the International Searching Authority, dated Mar. 23, 2021, for International Patent Application No. PCT/US2019/053470; 13 pages.

International Preliminary Report on Patentability received for PCT Patent Application No. PCT/US2019/053470, mailed on Apr. 8, 2021, 14 pages.

International Search Report and Written Opinion received for PCT Patent Application No. PCT/US2019/053470, mailed on Feb. 24, 2020, 18 pages.

International Search Report issued by the International Searching Authority, dated Aug. 21, 2018, for related International Patent Application No. PCT/US2018/020865; 6 pages.

International Search Report issued by the International Searching Authority, dated Feb. 24, 2020, for International Patent Application No. PCT/US2019/053470; 6 pages.

Invitation to Pay Additional Fees received for PCT Patent Application No. PCT/US2019/053470, mailed on Jan. 3, 2020, 15 pages.

Written Opinion issued by the International Searching Authority, dated Aug. 21, 2018, for related International Patent Application No. PCT/US2018/020865; 17 pages.

Written Opinion of the International Searching Authority, dated Feb. 24, 2020, for International Patent Application No. PCT/US2019/053470; 12 pages.

Yamaha Supplementary Service Manual, available at http://bergall.org/temp/venture/pdf./1983-1985-yamaha-venture-manual-complete-with-wiring-diagrams.pdf; copyright 1983; 452 pages.

* cited by examiner

TWO-WHEELED VEHICLE

CROSS-REFERENCE TO RELATED APPLICATIONS

The present application is a continuation of U.S. patent application Ser. No. 17/228,989, filed April 2021, which is a divisional of U.S. patent application Ser. No. 16/146,249, filed Sep. 28, 2018, now U.S. Pat. No. 11,077,910, the entire disclosures of which are incorporated herein by reference.

BACKGROUND OF THE DISCLOSURE

The present disclosure relates to a two-wheeled vehicle and, more particularly, to a motorcycle having a compact and modular configuration.

Various motorcycles may be configured for different applications and different preferences of riders. For example, a cruiser-type motorcycle may be suited for a rider that prefers comfort when traveling long distances rather than speed, whereas a sport or standard-type motorcycle may be preferred by riders who prefer enhanced speed capabilities. Typically, a sport or standard-type motorcycles are smaller in overall size than other types of motorcycles and, as such, the configuration of the various components on the bike are important. For example, a sport or standard-type motorcycle requires a fuel tank and airbox large enough to sustain the powertrain performance but able to be packaged with the other components of the motorcycle without increasing the size of the vehicle.

Additionally, because there are various vehicle platforms, it can be expensive and time-consuming to produce multiple motorcycles, each with unique components. As such, there is a need for a vehicle that may be applicable to multiple vehicle platforms to reduce manufacturing time and expense. For example, there is a need for a sport or standard-type vehicle platform that may be configured with various accessories and other components that allow the operator to customize the vehicle to his/her preferences and needs.

SUMMARY OF THE DISCLOSURE

In an illustrative embodiment of the present disclosure, a two-wheeled vehicle comprises a frame assembly having a front end and a rear end extending along a longitudinally-extending centerline, a front ground-engaging member operably coupled to the front end of the frame assembly at a front rotational axis, and a rear ground-engaging member operably coupled to the rear end of the frame assembly at a rear rotational axis. The vehicle further comprises an engine supported by the frame assembly and operably coupled to the front and rear ground-engaging members. The engine includes a throttle body assembly. Additionally, the vehicle comprises an air intake assembly fluidly coupled to the engine and including an airbox and a mounting plate having a first channel and a second channel. The first and second channels are configured to align with the throttle body assembly, and the mounting plate is configured to couple the airbox to the throttle body assembly.

A further illustrative embodiment of the present disclosure includes a two-wheeled vehicle comprising a frame assembly having a front end and a rear end extending along a longitudinally-extending centerline, a front ground-engaging member operably coupled to the front end of the frame assembly at a front rotational axis, and a rear ground-engaging member operably coupled to the rear end of the frame assembly at a rear rotational axis. The vehicle also comprises an engine supported by the frame assembly and operably coupled to the front and rear ground-engaging members. The engine includes at least a first cylinder and a second cylinder. Additionally, the vehicle comprises an airbox fluidly coupled to the engine. The vehicle also comprises a mounting member removably coupled to the engine and removably coupled to the airbox. The mounting member defines a first flow path configured to provide air from the airbox to the first cylinder of the engine and defines a second flow path configured to provide air from the airbox to the second cylinder of the engine.

A further illustrative embodiment of the present disclosure includes a two-wheeled vehicle comprising a frame assembly having a front end and a rear end extending along a longitudinally-extending centerline, a front ground-engaging member operably coupled to the front end of the frame assembly at a front rotational axis, and a rear ground-engaging member operably coupled to the rear end of the frame assembly at a rear rotational axis. The vehicle also comprises an engine supported by the frame assembly and operably coupled to the front and rear ground-engaging members. The engine includes a throttle body assembly. The vehicle also comprises an air intake assembly fluidly coupled to the engine and including an airbox and a mounting plate. The airbox is removably coupled to an upper surface of the mounting plate and the throttle body assembly is removably coupled to a lower surface of the mounting plate.

Another illustrative embodiment of the present disclosure includes a two-wheeled vehicle comprising a frame assembly having a front end and a rear end extending along a longitudinally-extending centerline, a front ground-engaging member operably coupled to the front end of the frame assembly at a front rotational axis, and a rear ground-engaging member operably coupled to the rear end of the frame assembly at a rear rotational axis. The vehicle further comprises an engine supported by the frame assembly and operably coupled to the front and rear ground-engaging members. Additionally, vehicle comprises a drive assembly operably coupled to the engine and including a drive sprocket, a driven sprocket, and a chain configured to rotate about the drive and driven sprockets. The vehicle also comprises a cover assembly configured to conceal at least a portion of the drive assembly. The cover assembly includes a laterally-outer cover configured to conceal the drive sprocket from a side view of the two-wheeled vehicle and a laterally-inner cover configured to conceal the drive sprocket from a front view of the two-wheeled vehicle.

Another illustrative embodiment of the present disclosure includes a two-wheeled vehicle comprising a frame assembly having a front end and a rear end extending along a longitudinally-extending centerline, a front ground-engaging member operably coupled to the front end of the frame assembly at a front rotational axis, and a rear ground-engaging member operably coupled to the rear end of the frame assembly at a rear rotational axis. The vehicle further comprises an engine supported by the frame assembly and operably coupled to the front and rear ground-engaging members. The front end of the frame assembly is configured to support at least a first accessory, and the rear end of the frame assembly is configured to support at least a second accessory. The first accessory is different from the second accessory.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a motorcycle, it should be understood, that the invention may have application to other types of vehicles such as all-terrain vehicles, watercraft, utility vehicles, snowmobiles, scooters, golf carts, and mopeds, as well as all types of motorcycles or other two-wheeled vehicles.

Figure 1:
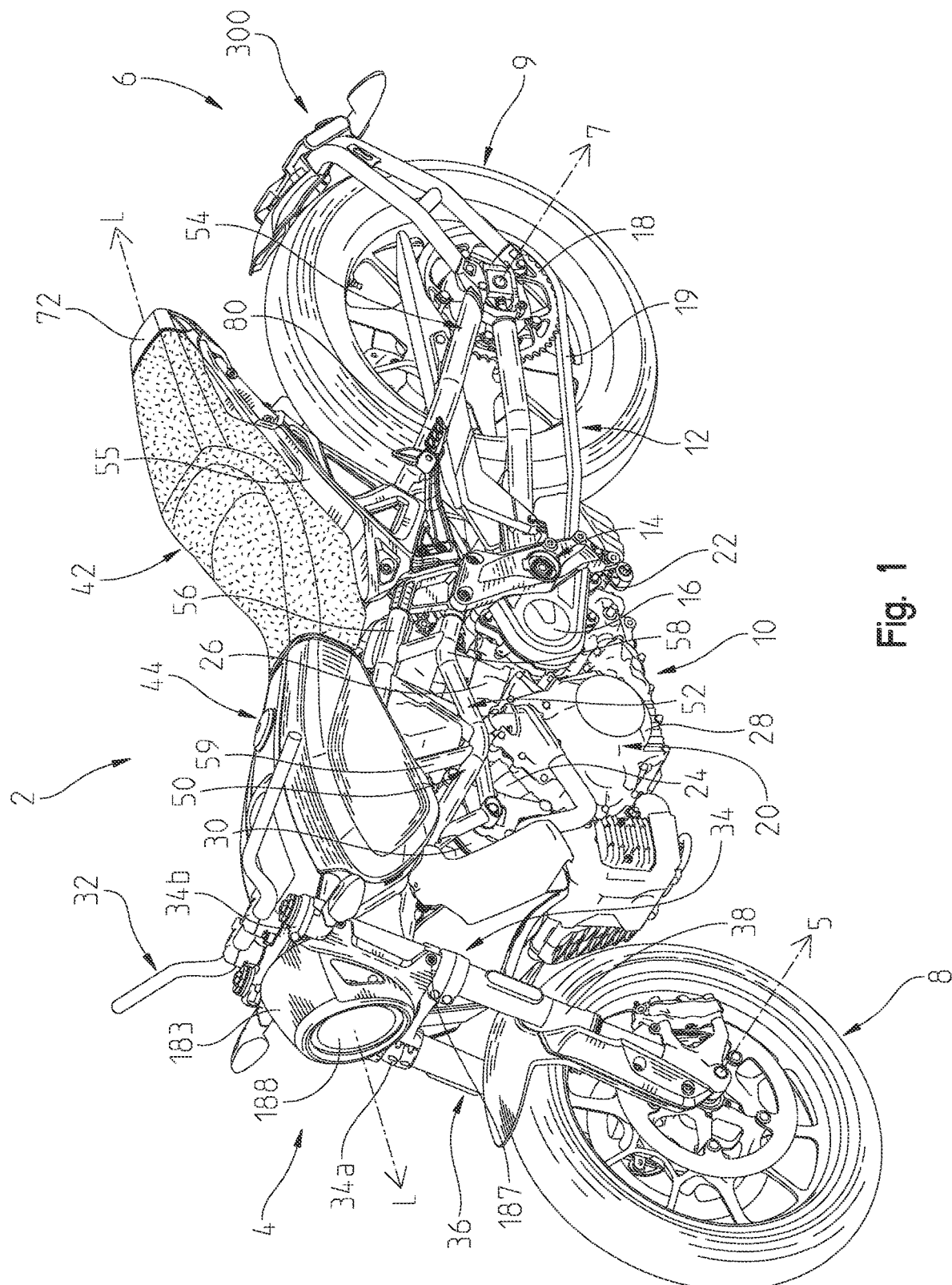
FIG. 1 is a front left perspective view of a vehicle of the present disclosure.

With reference to FIG. 1, an illustrative embodiment of a two-wheeled vehicle 2 is shown. Vehicle 2 may be configured as any type of motorcycle, such as a sport or standard-type motorcycle, a touring motorcycle, a cruiser motorcycle, and other embodiments of a motorcycle-type vehicle. Vehicle 2 extends from a front end 4 to a rear end 6 along a longitudinal centerline L. Front end 4 of vehicle 2 includes at least one ground engaging member, namely a front wheel 8 configured to rotate about a front wheel rotational axis 5, and rear end 6 of vehicle 2 includes at least one rear ground engaging member, illustratively a rear wheel 9 configured to rotate about a rear wheel rotational axis 7. It will be appreciated that while the vehicle 2 is illustrated as a two-wheel vehicle, various embodiments of the present teachings are also operable with three, four, six etc. wheeled vehicles.

Referring still to FIG. 1, rear wheel 9 is coupled to a powertrain assembly 10, through a drive assembly 12, to propel vehicle 2 through rear wheel 9, as is disclosed further herein. Drive assembly 12 includes a drive shaft 14, a drive sprocket 16 (FIG. 10) operably coupled to drive shaft 14, and a driven sprocket 18 operably coupled to drive sprocket 16 through a belt or chain 19 (FIG. 1).

Powertrain assembly 10 includes both an engine 20 and transmission 22. Transmission 22 is coupled to engine 20 which provides power to rear wheel 9 through drive shaft 14. In the illustrated embodiment, engine 20 is a V-twin, gasoline engine that includes a first or front cylinder 24 and a second or rear cylinder 26 operably coupled together with a crankshaft (not shown) configured to rotate about a rotation axis. First and second cylinders 24, 26 and the crankshaft are generally supported on a crankcase 28 of engine 20. Illustratively, first and second cylinders 24, 26 define a 60-degree V configuration. In other embodiments, engine 20 includes any number of cylinders arranged in any configuration (e.g., 90-degree). Each of cylinders 24, 26 includes a cylinder head 30 and a piston (not shown) is configured to reciprocate within each cylinder 24, 26, thereby causing rotation of the crankshaft. Additional details of engine 20 may be disclosed in U.S. patent application Ser. No. 14/213,161, filed Mar. 14, 2014, and entitled "TWO-WHEELED VEHICLE", and U.S. patent application Ser. No. 14/214,033, filed Mar. 14, 2014, and entitled "ENGINE", the complete disclosures of which are expressly incorporated by reference herein. It also will be appreciated that while engine 20 is illustrated as a gasoline engine, electric motors and other suitable torque-generating machines are operable with various embodiments of the present disclosure. Additionally, in one embodiment, powertrain assembly 10 includes a continuous variable transmission.

Figure 5:
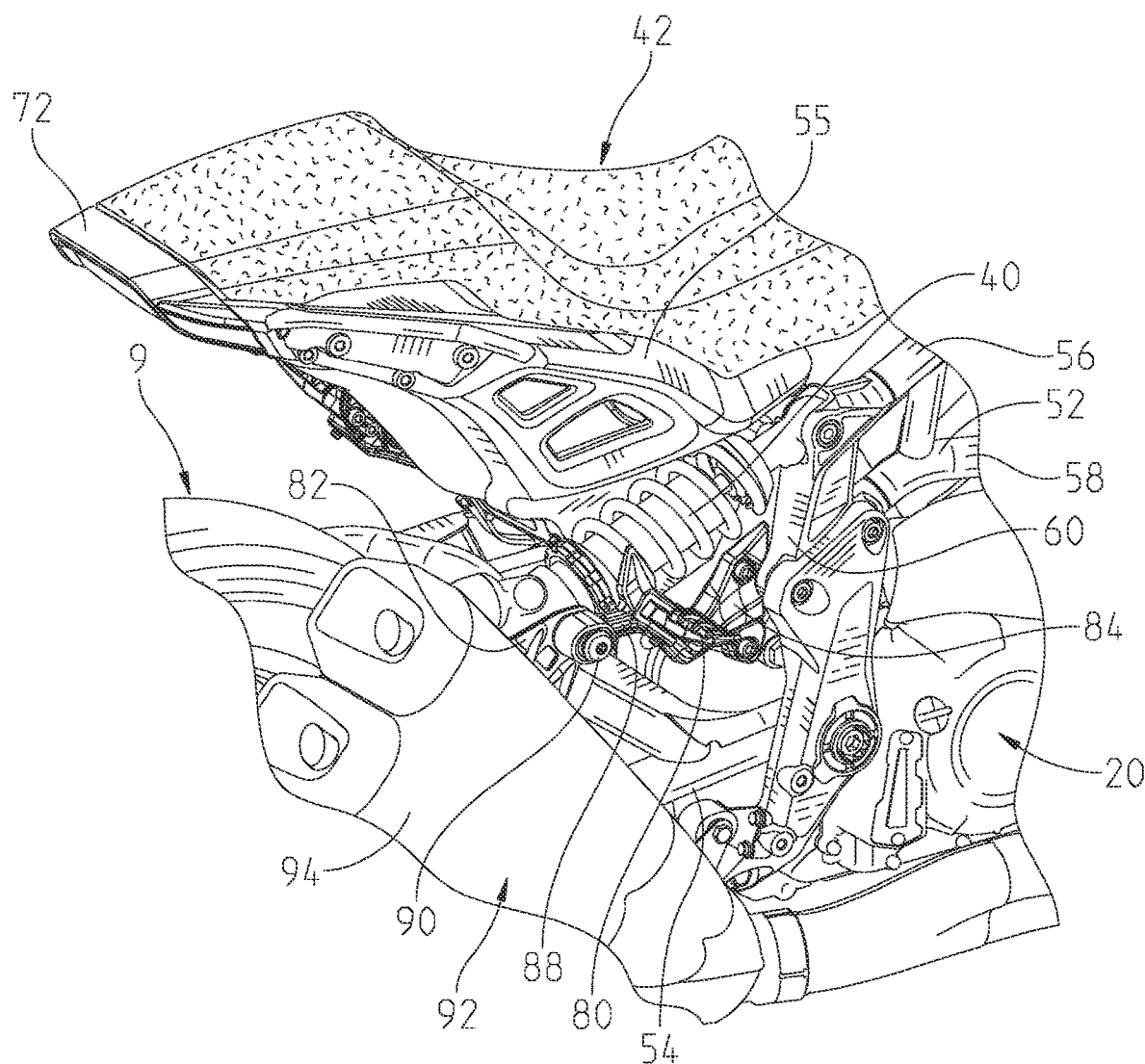
FIG. 5 is a rear right perspective view of a tail light of the vehicle of FIG. 1.

Referring still to FIG. 1, vehicle 2 also generally includes a steering assembly 32, illustratively handlebars. The handlebars may include operator controls, such as throttle and braking inputs, for operating vehicle 2. Additionally, vehicle 2 may include foot controls for braking and/or throttle control. Steering assembly 32 may be operably coupled to a triple clamp assembly 34, defined by a lower triple clamp 34a and an upper triple clamp 34b), and front forks 36 which may include a front suspension assembly 38. Additionally, vehicle 2 includes a rear suspension assembly 40 (FIG. 5). As shown in FIG. 5, a seat 42 may be at least partially positioned above a portion of rear suspension assembly 40 and, illustratively, is configured as a straddle seat to support at least the operator but also may be configured to support at least one passenger rearward of the operator. A cargo or storage container (not shown) also may be included on vehicle 2, either forward or rearward of seat 42. Additionally, seat 42 is positioned generally rearward of a fuel tank 44.

Referring to FIGS. 1-4, vehicle 2 includes a frame assembly 50 supported by front and rear wheels 8, 9 (FIG. 1). Frame assembly 50 includes a main frame 52 and subframe 55 coupled together. Various portions of main frame 52 may be comprised of a metallic material, for example steel, and main frame 52 includes upper longitudinally-extending members 56 and lower longitudinally-extending members 58. Both upper and lower longitudinally-extending members 56, 58 are coupled to a head tube (not shown), which is configured to receive a portion of steering assembly 32 (FIG. 1). Upper and lower longitudinally-extending frame members 56, 58 are coupled together through a plurality of cross-members 59.

Figure 2:
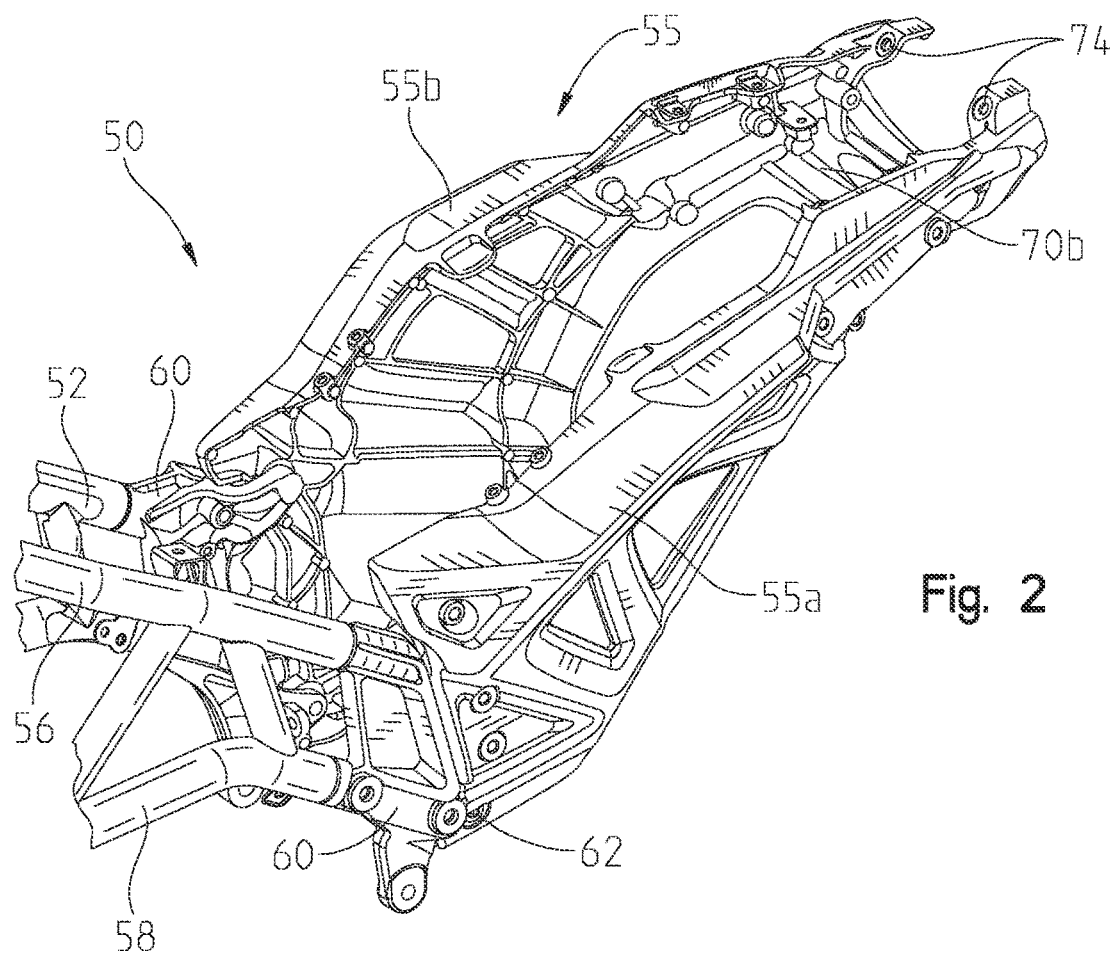
FIG. 2 is a front left perspective view of a frame assembly of the vehicle of FIG. 1.
Figure 3:
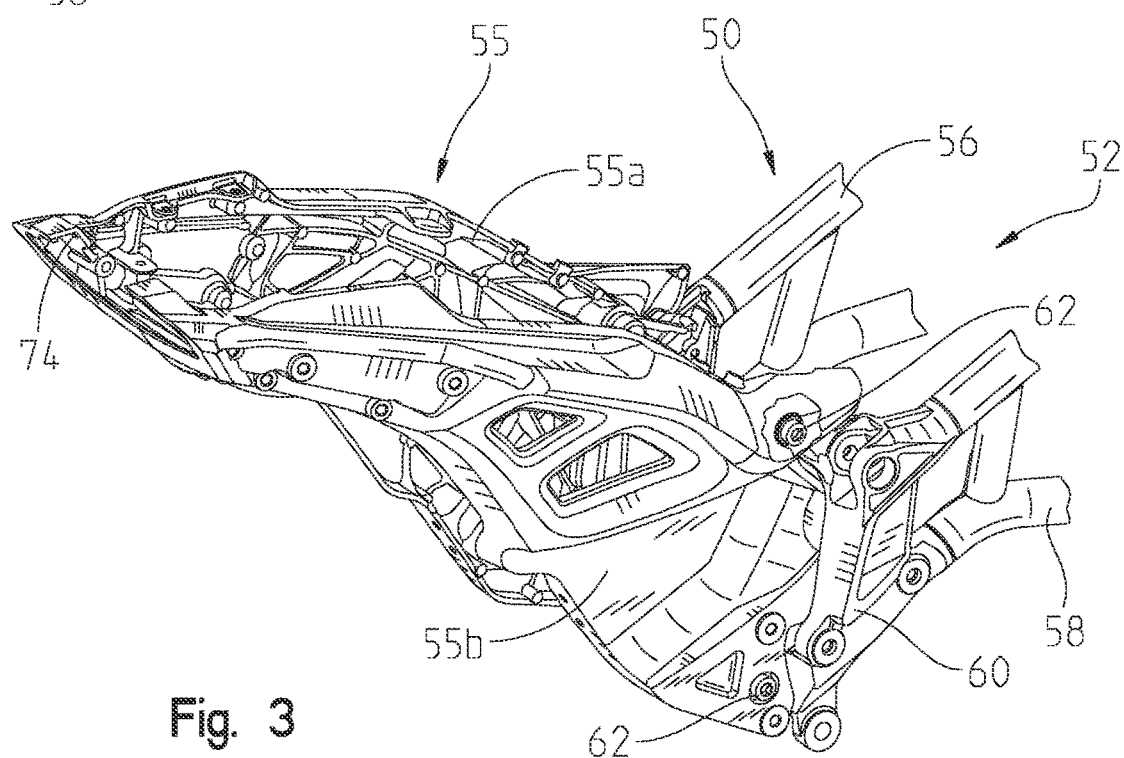
FIG. 3 is a rear right perspective view of the frame assembly of FIG. 2.
Figure 4:
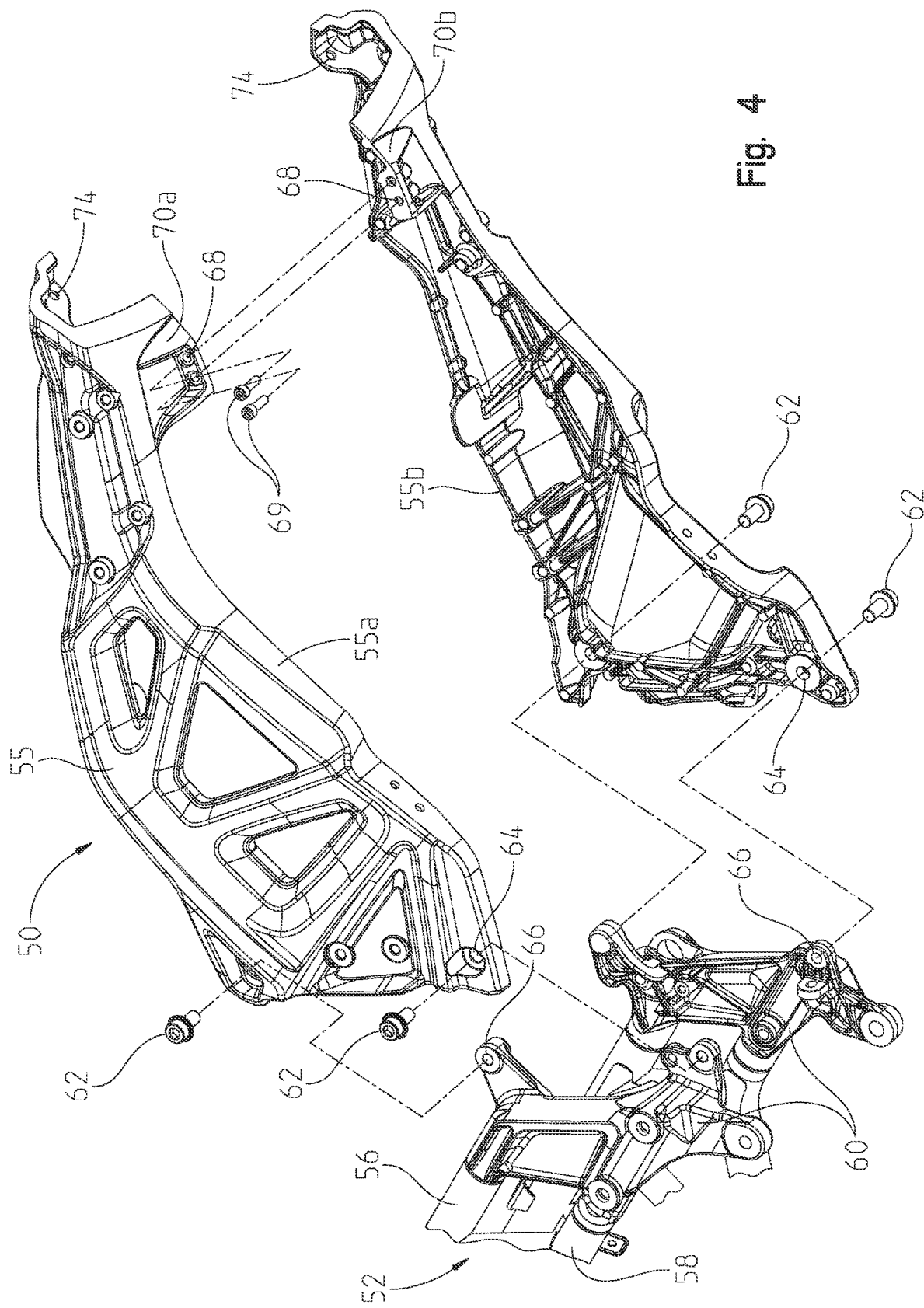
FIG. 4 is an exploded view of the frame assembly of FIG. 2.

Illustratively, main frame 52 generally surrounds powertrain assembly 10 and, more particularly, extends over and forward of engine 20 and transmission 22. Illustratively, longitudinally-extending members 56, 58 may be coupled to subframe 55 of frame assembly 50 through coupling members 60. Main frame 52, including coupling members 60, may be comprised of a metallic material and, in one embodiment, may be castings comprised of steel. As shown in FIGS. 2-4, coupling members 60 may be integral with longitudinally-extending members 56, 58 or, alternatively, may be removable therefrom with removable fasteners (not shown).

Coupling members 60 are removably coupled to subframe 55 with removable fasteners 62. Fasteners 62 are received through front mounting bores 64 on subframe 55 and mounting bores 66 on coupling members 60. The configuration of subframe 55 is removably coupled to main frame 52 and is comprised of cast aluminum.

Subframe 55 further includes rear mounting bores 68 which are configured to receive removable fasteners 69 therethrough. More particularly, mounting bores 68 are defined within complementary protrusions 70 on subframe 55. Illustrative subframe 55 includes a first side portion 55a and a second side portion 55b which are positioned on the left and right sides of vehicle 2, respectively, and, together, define a clam-shell configuration of subframe 55. A first protrusion 70a of first side portion 55a extends inwardly towards longitudinal centerline L (FIG. 1) and also towards a second protrusion 70b of second side portion 55b, which also extends inwardly towards longitudinal centerline L. In this way, first and second protrusions 70a, 70b further define the clam-shell configuration of subframe 55 and are coupled together with fasteners 69. When side portions 55a, 55b of subframe 55 are coupled together, seat 42 may be supported thereon. It may be appreciated from the illustrative embodiment of FIGS. 2-4 that protrusions 70a, 70b may be integrally formed with respective side portions 55a, 55b.

Figure 6:
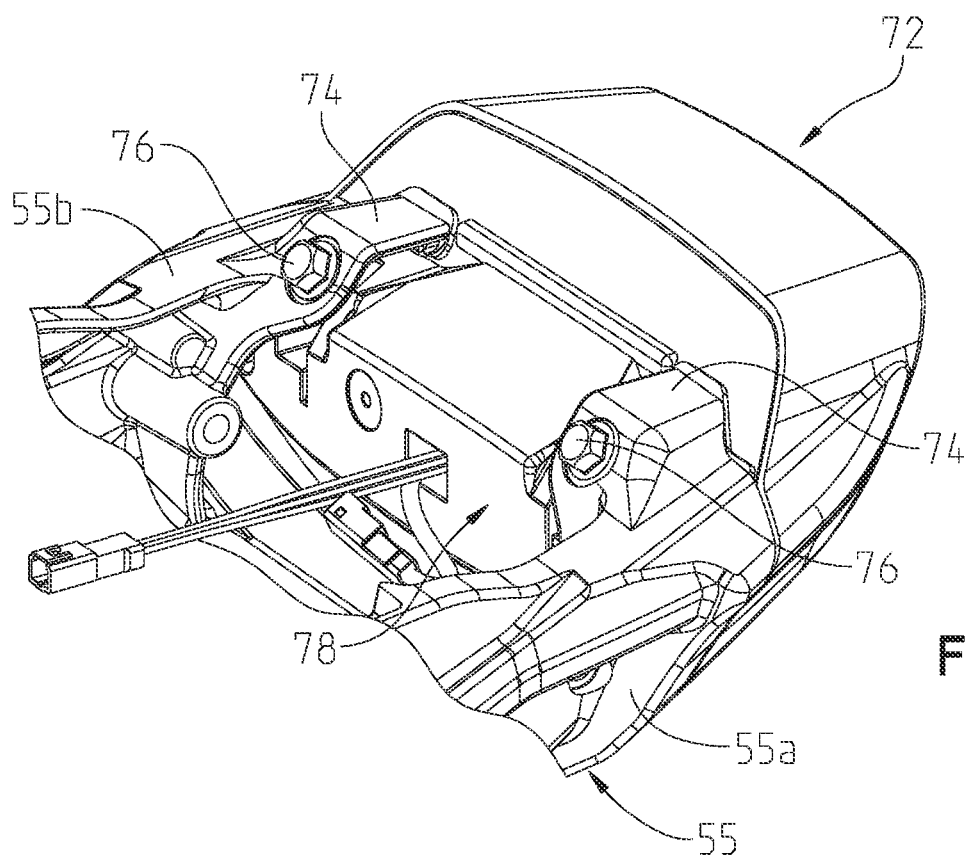
FIG. 6 is a front right perspective view of the tail light of FIG. 5.

Referring to FIGS. 5 and 6, subframe 55 further supports a tail light 72 such that an additional rear body panel is not required to mount tail light 72 to vehicle 2. More particularly, subframe 55 includes mounting members 74 which couple with a forward portion of tail light 72 to support tail light 72 directly on subframe 55, rather than through additional body panels. For example, in one embodiment, mounting members 74 of subframe 55 each includes an aperture configured to receive at least one removable fastener 76, as shown best in FIG. 6. The clam-shell configuration of subframe 55 also allows a housing 78 of tail light 72 to be supported between side portions 55a, 55b. Housing 78 may support various components of tail light 72, such as electrical wires, light bulbs, and other such components.

Figure 7:
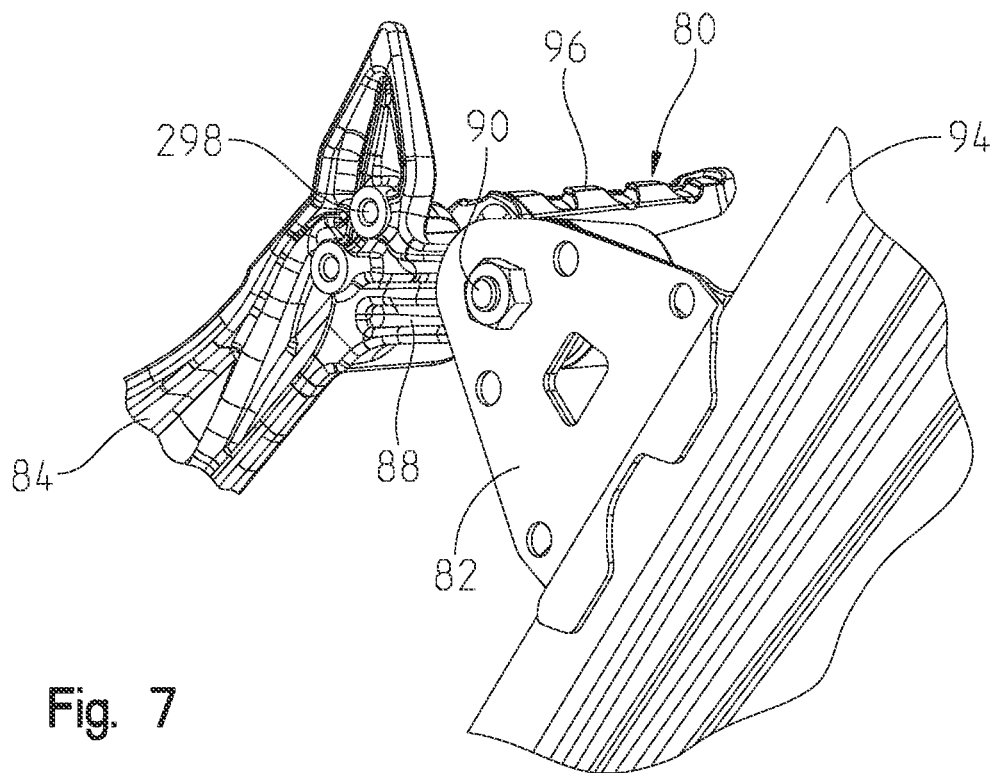
FIG. 7 is a rear left perspective view of a passenger foot peg of the vehicle of FIG. 1.
Figure 8:
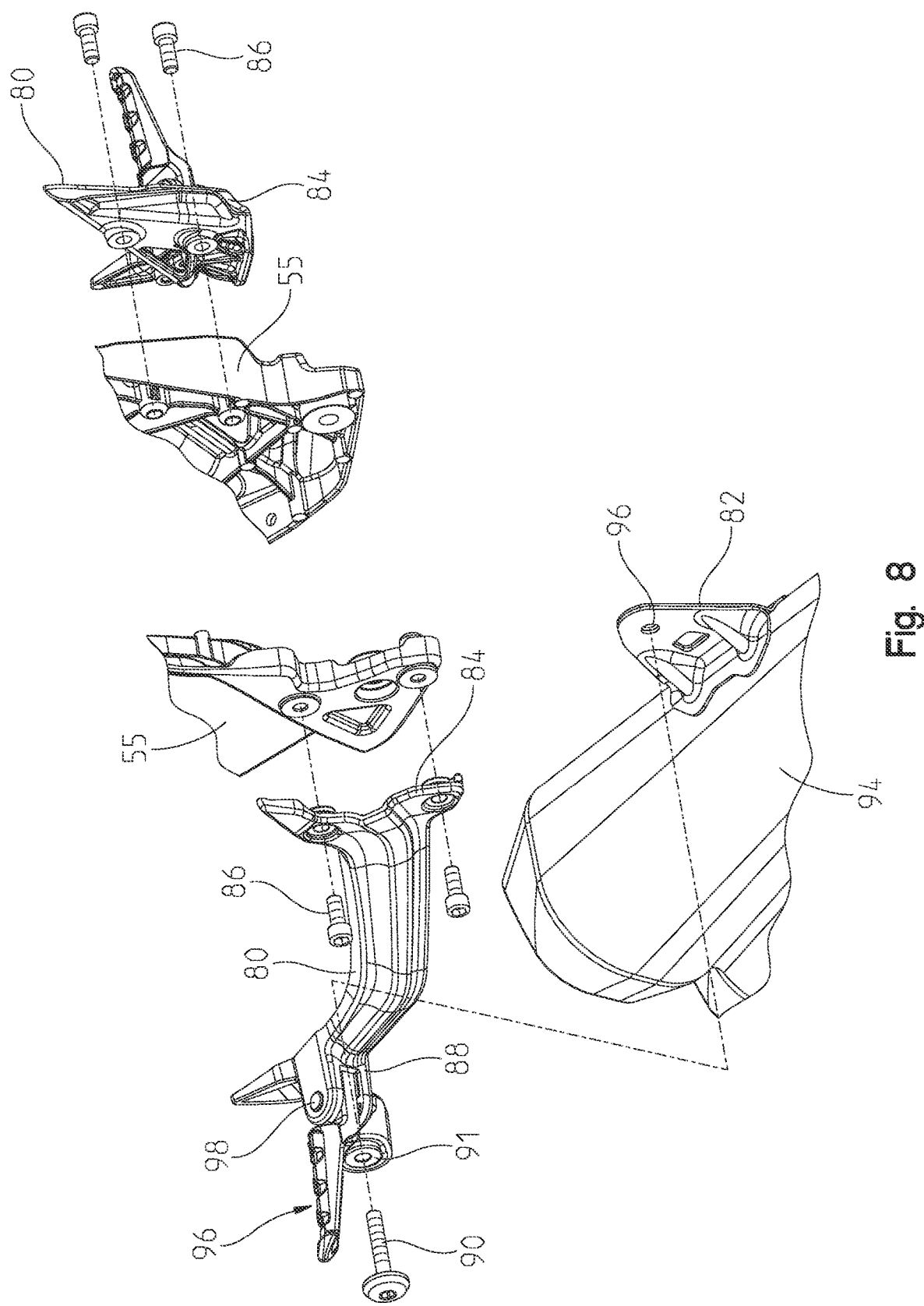
FIG. 8 is an exploded view of the passenger foot peg of FIG. 7.

Referring now to FIGS. 5, 7, and 8, vehicle 2 is configured to support both an operator and a passenger on seat 42 and vehicle 2 also includes a rear or passenger foot peg 80 for a passenger seated on seat 42. As shown best in FIG. 8, vehicle 2 includes right and left foot pegs 80 which are coupled to a portion of subframe 55. Illustratively, foot pegs 80 each include a forward mounting portion 84 coupled to subframe 55 with at least one removable fastener 86. In this way, foot pegs 80 are coupled to subframe 55.

With respect to foot peg 80 on the right side of vehicle 2, right-side foot peg 80 is further supported with a bracket 82. Illustrative right-side foot peg 80 includes a rearward mounting portion 88 which is coupled to bracket 82 with a removable fastener 90. Bracket 82 is fixed to a portion of an exhaust assembly 92 of vehicle 2 and, more particularly, is permanently fixed through a weld nut or other permanent coupling mechanism to a muffler 94 of exhaust assembly 92. As shown best in FIG. 7, bracket 82 is fixed to an inner portion and an upper surface of muffler 94 and extends upwardly therefrom. In this way, muffler 94 is supported from bracket 82 as muffler 94 hangs therefrom.

Bracket 82 includes a mounting aperture for receiving fastener 90. The aperture includes a bushing 91 (FIG. 8) comprised of a dampening material (e.g., rubber) to isolate foot peg 80 from any vibration or other movement in muffler 94. In the illustrative embodiment of FIG. 5, it is apparent that bracket 82 further supports a rearward portion of a shock absorber of rear suspension assembly 40 and fastener 90 may be configured to extend through foot peg 80, bracket 82, and a portion of the shock absorber for coupling the same together.

Foot peg 80 further includes a tread portion 96 which extends generally perpendicularly to longitudinal centerline L (FIG. 1) when configured to support a passenger's foot. However, as shown in FIG. 8, tread portion 96 may be configured to pivot forwardly and/or rearwardly about a pivot pin or member 98 to move tread portion 96 between a closed position, which is generally parallel to longitudinal centerline L, and an open position, which is generally perpendicular to longitudinal centerline L.

Figure 9:
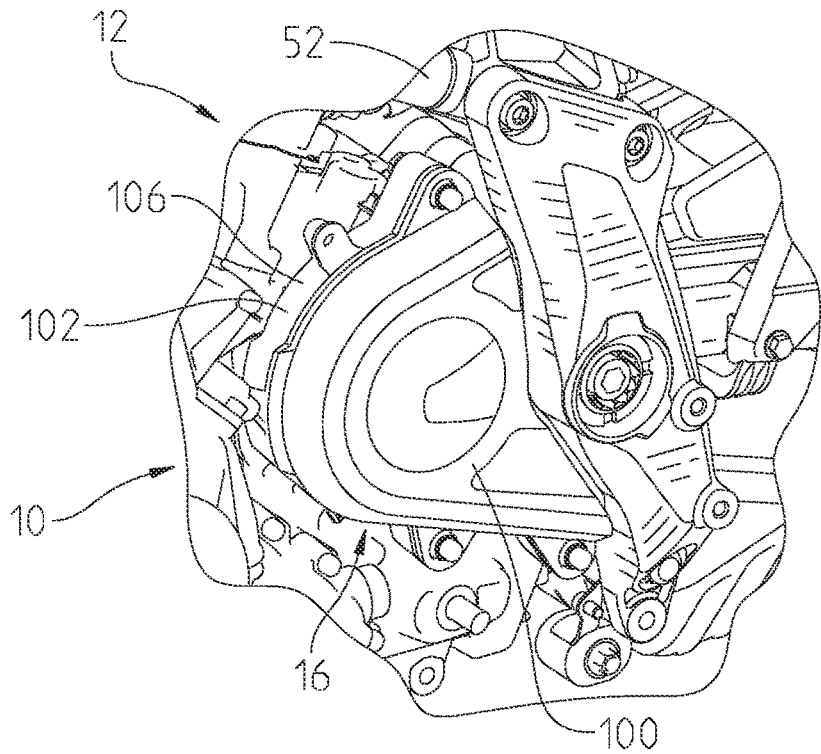
FIG. 9 is a front left perspective view of a sprocket and chain guard of the vehicle of FIG. 1.
Figure 10:
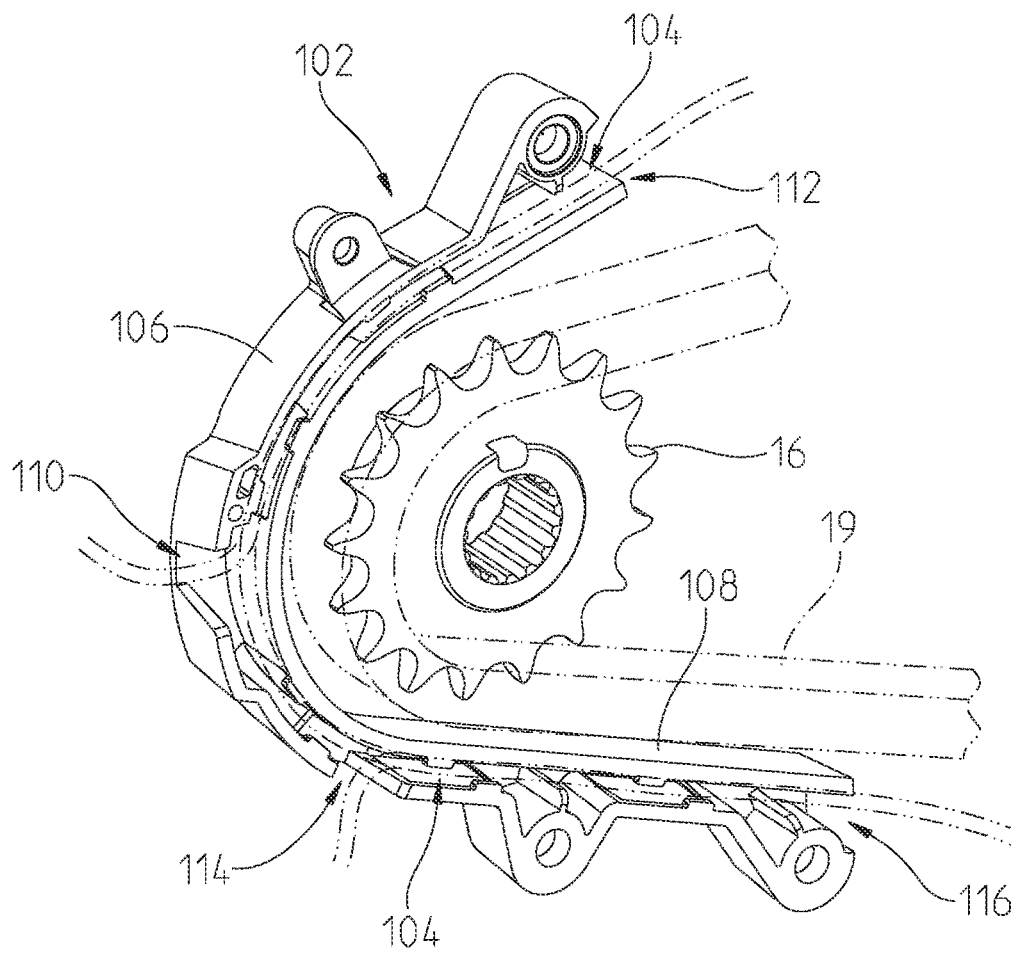
FIG. 10 is a further front left perspective view of the sprocket and chain guard of FIG. 9.

Referring now to FIGS. 9 and 10, a portion of drive assembly 12 is shown. In particular, drive sprocket 16 is generally concealed by a cover 100 and a sprocket/chain guard 102. Cover 100 and sprocket/chain guard 102 are supported by crankcase 28 and both include a rounded or curved forward portion configured to generally receive and encompass at least a portion of drive sprocket 16. Sprocket/ chain guard 102 is coupled to cover 100 with removable fasteners and is positioned laterally inward of cover 100.

Illustrative sprocket/chain guard 102 includes a channel 104 defined intermediate an outer surface 106 and an inner surface 108 of sprocket/chain guard 102. Channel 104 is configured to receive wires or other lines to prevent interference with chain or belt 19 and also conceal the wires or lines from an outside view of vehicle 2. Illustratively, inner surface 108 is positioned adjacent chair or belt 19 and outer surface 106 defines an outer surface of sprocket/chain guard 102 which is visible on vehicle 2. In this way, channel 104, and the wires or lines contained therein, are concealed from view on vehicle 2 and also are concealed from chain or belt 19. As shown best in FIG. 9, sprocket/chain guard 102 is configured as an extension of cover 100 such that sprocket/chain guard 102 and cover 100 are aesthetically complementary to each other.

Additionally, as shown best in FIG. 10, sprocket/chain guard 102 includes a plurality of inlets and/or outlets 110, 112, 114, 116 in which wires or lines may be inserted into or extracted from channel 104.

Referring to FIGS. 11A-13, vehicle 2 further includes an air intake assembly 120 which includes an airbox 122 supported within a portion of main frame 52 and generally positioned between upper and lower longitudinally-extending members 56, 58 along longitudinal centerline L (FIG. 1). In one embodiment, airbox 122 is directly coupled to engine 20 through a throttle body assembly, as disclosed further herein. Airbox 122 includes an upper housing portion 124 and a lower housing portion 126 hingedly or removably coupled to each other. In this way, upper housing portion 124 may be opened or removed to expose an internal air volume 128. Airbox 122 further includes a panel 125 which includes a filter 129 for filtering the incoming air before it flows to engine 20. Panel 125 is removably coupled to upper housing portion 124 with fasteners 127 and filter 129 extends within air volume 128 longitudinally forward of tubes 123 which are fluidly coupled to engine 20. In operation, airbox 122 is configured to receive ambient air and flow the air through air volume 128 to provide filtered air to a throttle body assembly 130 of engine 20. More particularly, lower housing portion 126 includes a first outlet 132 configured to align and fluidly couple with a first throttle body 134 to provide filtered air to front cylinder 24 for combustion therein. Additionally, lower housing portion 126 includes a second outlet 136 configured to align and fluidly couple with a second throttle body 138 to provide filtered air to rear cylinder 26 for combustion therein.

Figure 11A:
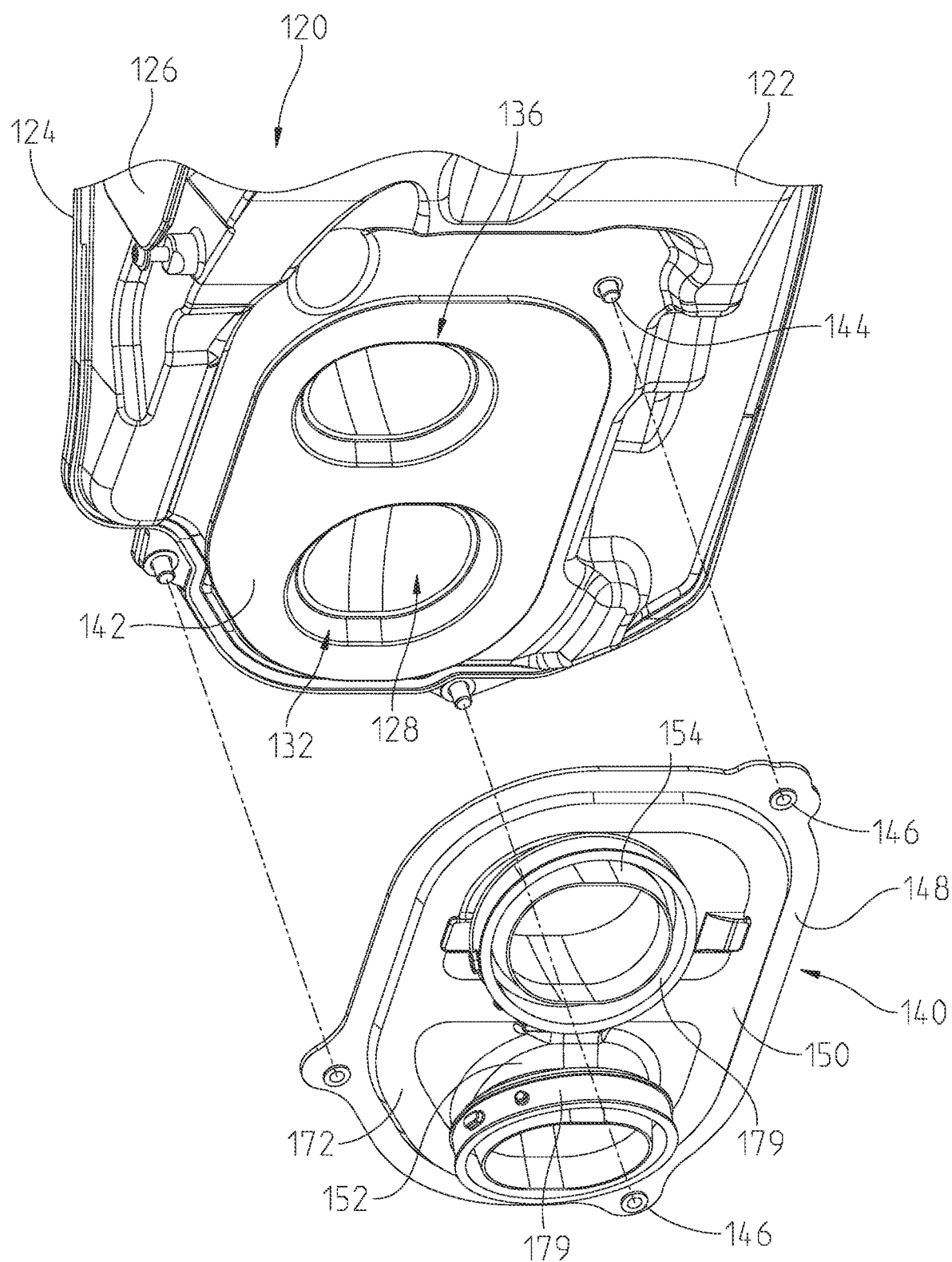
FIG. 11A is an exploded view of an airbox assembly of the vehicle of FIG. 1.

Referring still to FIGS. 11A-13, to couple airbox 122 with throttle body assembly 130, a mounting plate 140 may be used. Mounting plate 140 is positioned vertically intermediate airbox 122 and throttle body assembly 130 such that airbox 122 is coupled to an upper surface 170 of mounting plate 140 and throttle body assembly 130 is coupled to a lower surface 172 of mounting plate 140. More particularly, mounting plate 140 is configured to couple with a lower surface 142 of lower housing portion 126 of airbox 122 through top-mounted fasteners 144. Illustratively, as shown in FIGS. 11A and 11B, fasteners 144 extend through lower surface 142 and an upper surface of mounting plate 140. In one embodiment, mounting plate 140 includes a seal, illustratively a gasket, 148 which includes apertures 146 configured to receive fasteners 144 such that airbox 122 is coupled to mounting plate 140 through seal 148. Fasteners 144 are configured to extend downwardly from lower surface 142 of airbox 122 and through an upper surface 174 of seal 148.

Seal 148 generally surrounds a body portion 150 of mounting plate 140. Body portion 150 includes a first channel or boot 152 configured to align and fluidly couple with first outlet 132 and first throttle body 134 and a second channel or boot 154 configured to align and fluidly couple with second outlet 136 and second throttle body 138. Channels 152, 154 define respective first and second flow paths through mounting plate 140, thereby defining respective first and second flow paths from first outlet 132 to first throttle body 134 and second outlet 136 to second throttle body 138. Channels 152, 154 may be overmolded boots which are integral with body portion 150. Yet, channels 152, 154 are distinct and separate air flow paths which are spaced apart from each by a portion of body portion 150 in order to provide discreet volumes of air to first and second cylinders 24, 26. Channels 152, 154 may be comprised of a polymeric and/or metallic material and are configured to seal against lower surface 142 of airbox 122 and throttle body assembly 130. In this way, mounting plate 140 is configured to facilitate alignment, sealing, and coupling of airbox 122 to throttle body assembly 130.

Channels 152, 154 each includes an upper portion 178 extending upwardly from body portion 150 and configured to be at least partially received within airbox 122. More particularly, upper portion 178 of channel 152 is configured to be at least partially received within first outlet 132 and extend upwardly towards air volume 128. Additionally, upper portion 178 of channel 154 is configured to be at least partially received within second outlet 136 and extend upwardly towards air volume 128.

Channels 152, 154 also each includes a lower portion 179 extending downwardly from body portion 150 and configured to be at least partially received within throttle body assembly 130 or configured to at least partially receive a portion of throttle body assembly 130. More particularly, lower portion 179 of channel 152 is configured to be at least partially received within first throttle body 134 or is configured to receive a portion of first throttle body 134. Additionally, lower portion 179 of channel 154 is configured to be at least partially received within second throttle body 138 or receive a portion of second throttle body 138.

Figure 11B:
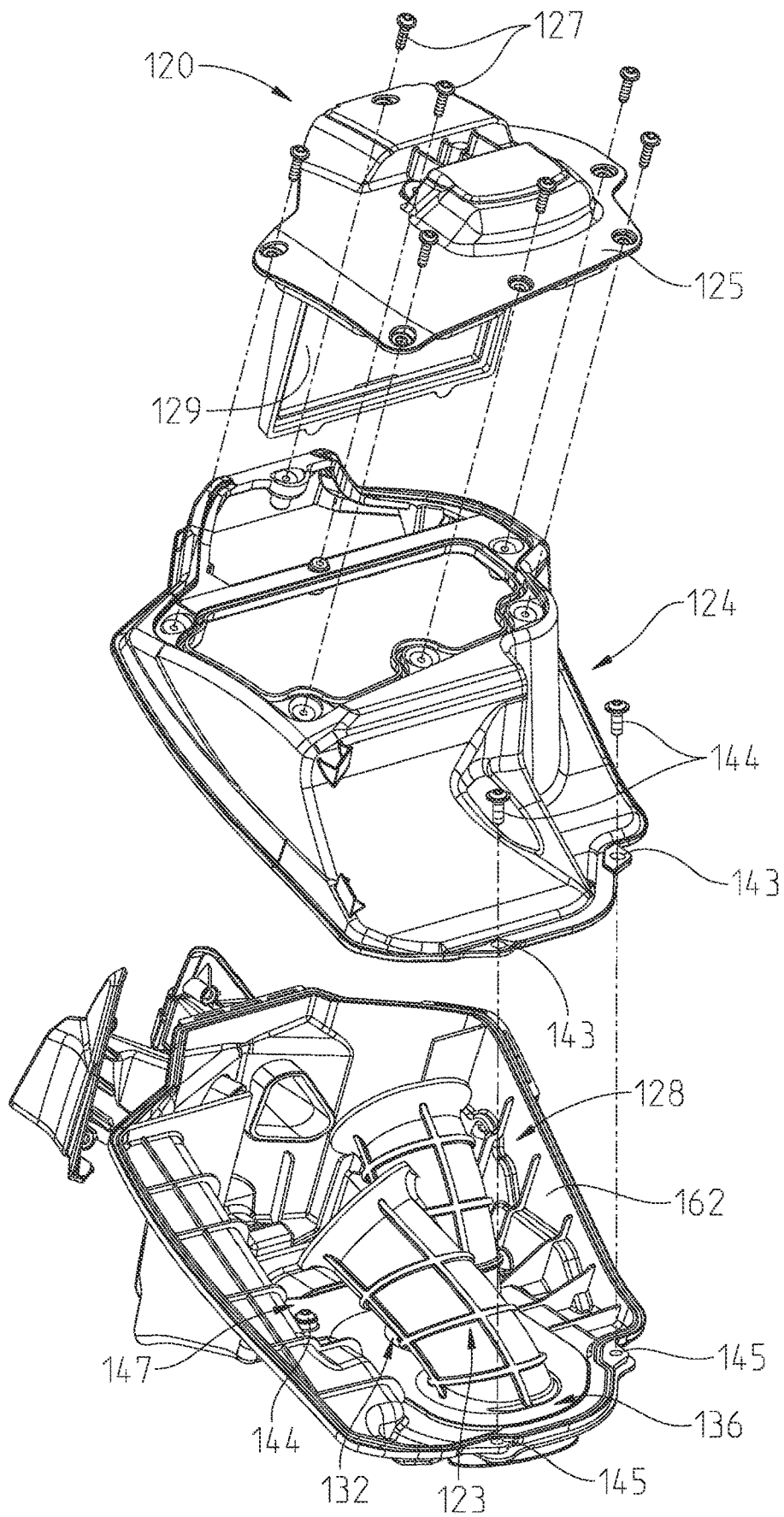
FIG. 11B is a further exploded view of the airbox assembly of FIG. 11A.
Figure 12:
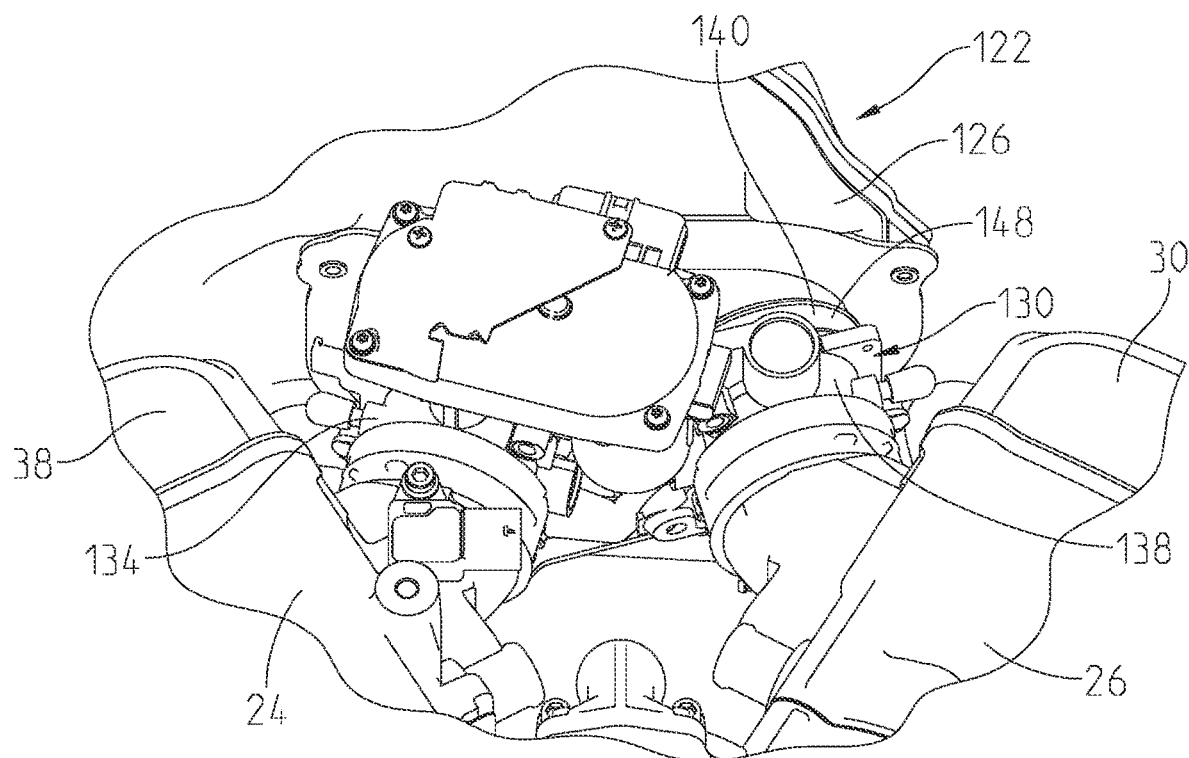
FIG. 12 is a right perspective view of the airbox assembly of FIG. 11A.
Figure 13:
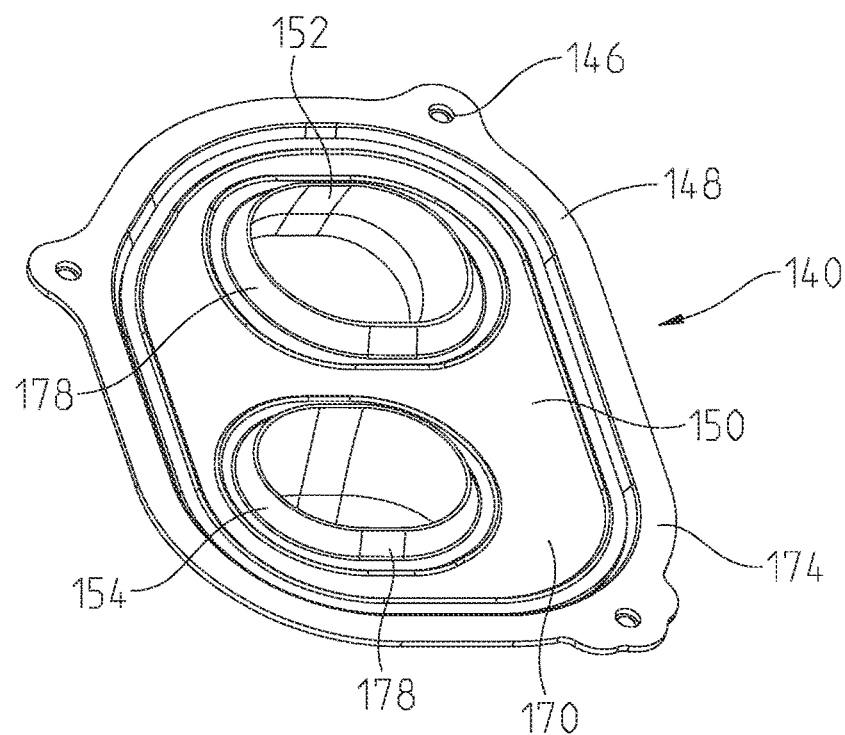
FIG. 13 is a perspective view of a mounting plate of the airbox assembly of FIG. 11A.

During assembly airbox 122 on vehicle 2, it may be appreciated that mounting plate 140 is first attached to throttle body assembly 130 through lower portions 179 of channels 152, 154. Then, airbox 122 is positioned over the top of mounting plate 140 and one of fasteners 144 are received through an aperture of lower housing portion 126 within a portion of air volume 128, as shown at 147 in FIG. 11B. Additional fasteners 144 are positioned at and received through apertures 143, 145 of upper and lower housing portions 124, 126, respectively, and, as shown in FIG. 11B, apertures 143, 145 are positioned along a perimeter of housing portions 124, 126. With fasteners 144, airbox 122 is positioned adjacent upper surface 170 of mounting plate 140 and is coupled thereto.

Figure 14:
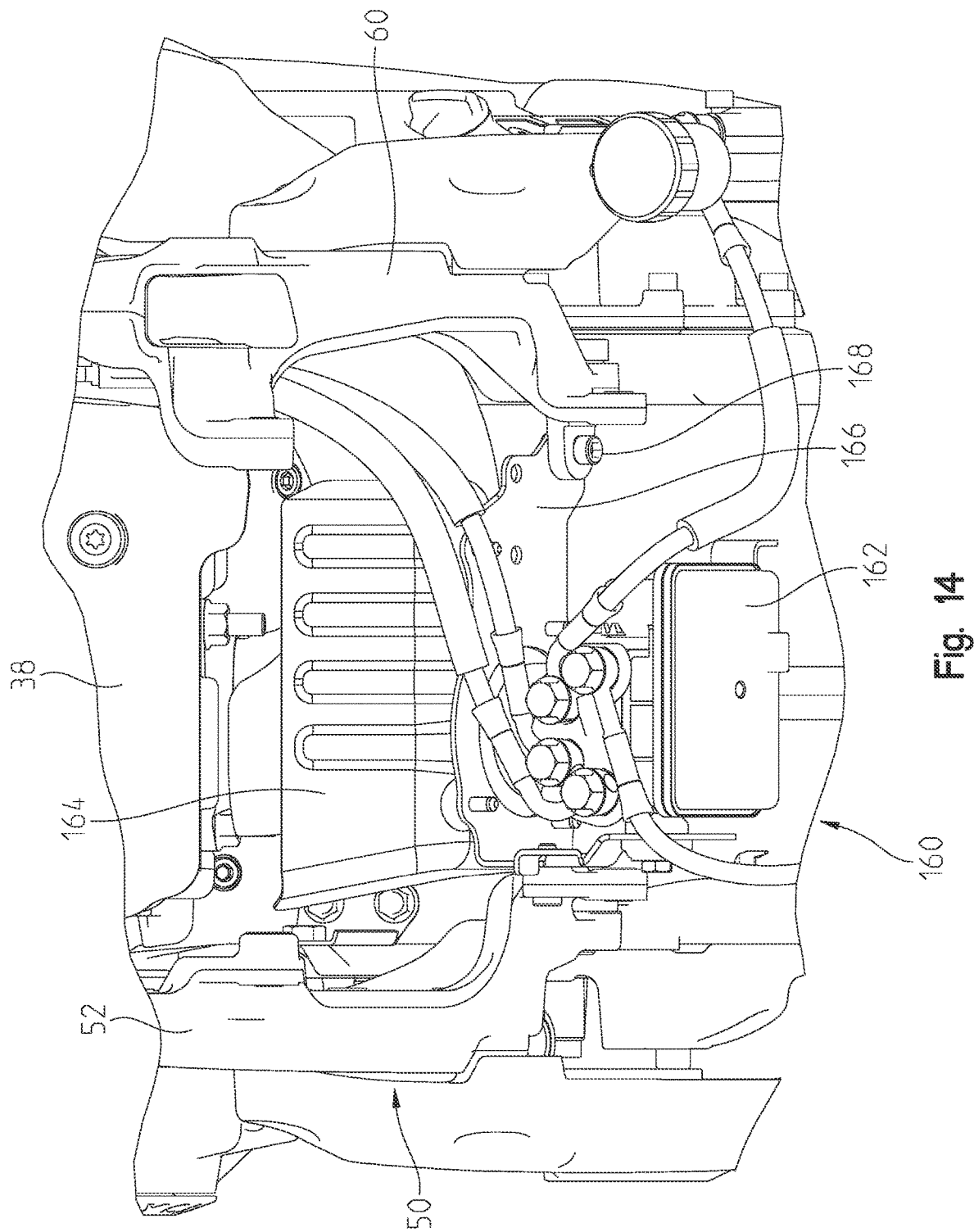
FIG. 14 is a rear perspective view of a heat shield for an ABS module of the vehicle of FIG. 1.
Figure 15:
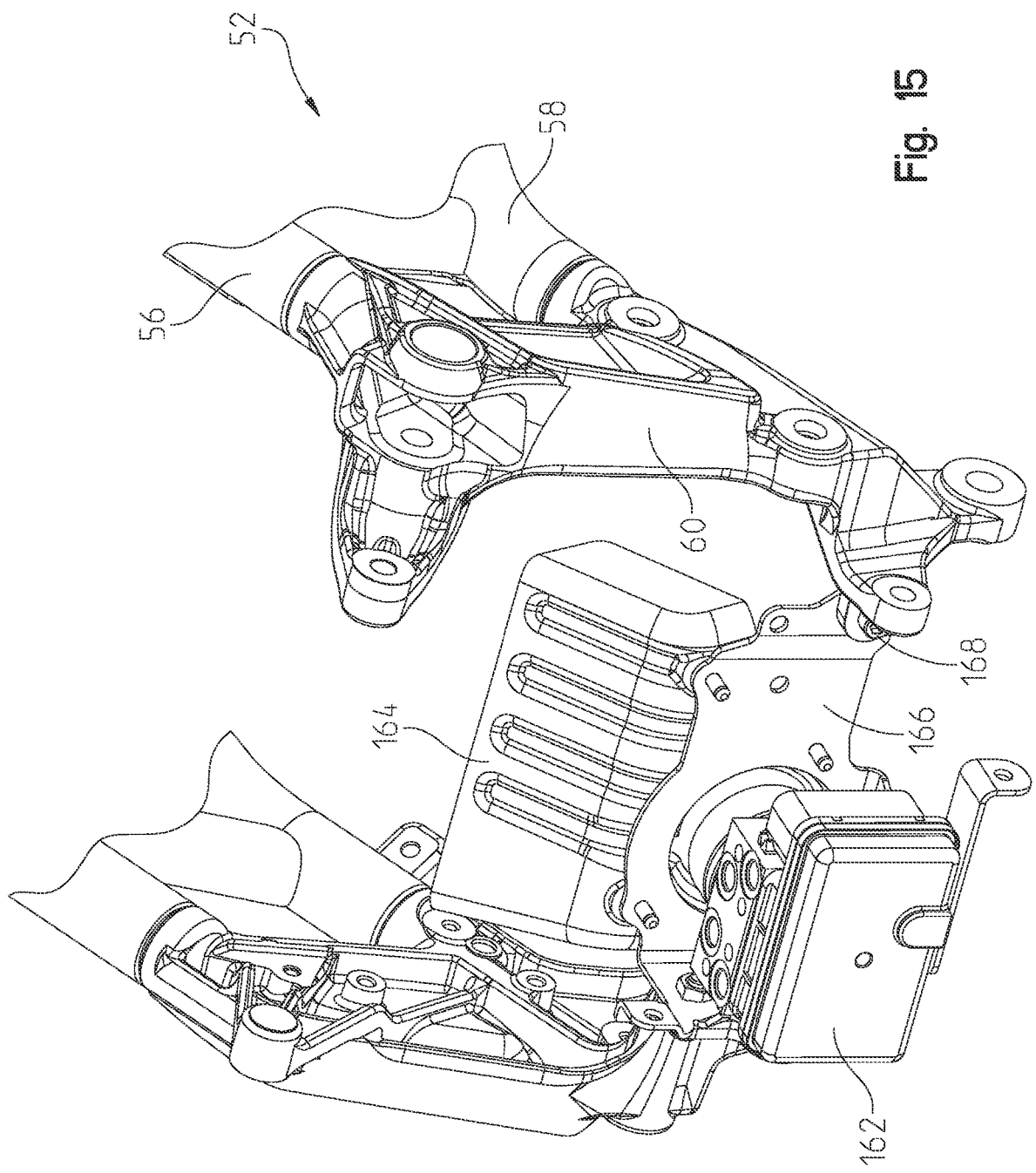
FIG. 15 is a rear right perspective view of the heat shield and ABS module of FIG. 14.

Referring to FIGS. 14 and 15, vehicle 2 includes an electrical assembly 160 which may include various electrical components. In one embodiment, electrical assembly 160 includes tail light 72 and other light components, as disclosed further herein. Additionally, electrical assembly 160 may include an anti-lock brake system or assembly ("ABS") module 162 also supported on a portion of frame assembly 50, as shown in FIG. 14. As shown therein, ABS module 162 is positioned directly above a portion of a swing arm 54 (FIG. 1). ABS module 162 is operably coupled to the brakes on front and/or rear wheels 8, 9, respectively, to facilitate braking in response to an operator input.

To prevent ABS module 162 from experiencing increased heat from engine 20, a heat shield 164 is positioned longitudinally intermediate rear cylinder 26 and ABS module 162. More particularly, heat shield 164 is positioned longitudinally intermediate cylinder head 30 of rear cylinder 26 and ABS module 162. Heat shield 164 also may include a support member 166 for supporting ABS module 162 on frame assembly 50. Illustratively, support member 166 may be integrated with heat shield 164 such that heat shield 164 and support member 166 are a single piece or component. However, in other embodiments, support member 166 may be removably coupled to heat shield 164 with removable fasteners. Support member 166 is coupled to frame assembly 50, specifically coupling members 60 of main frame 52, with removable fasteners 168.

Figure 16:
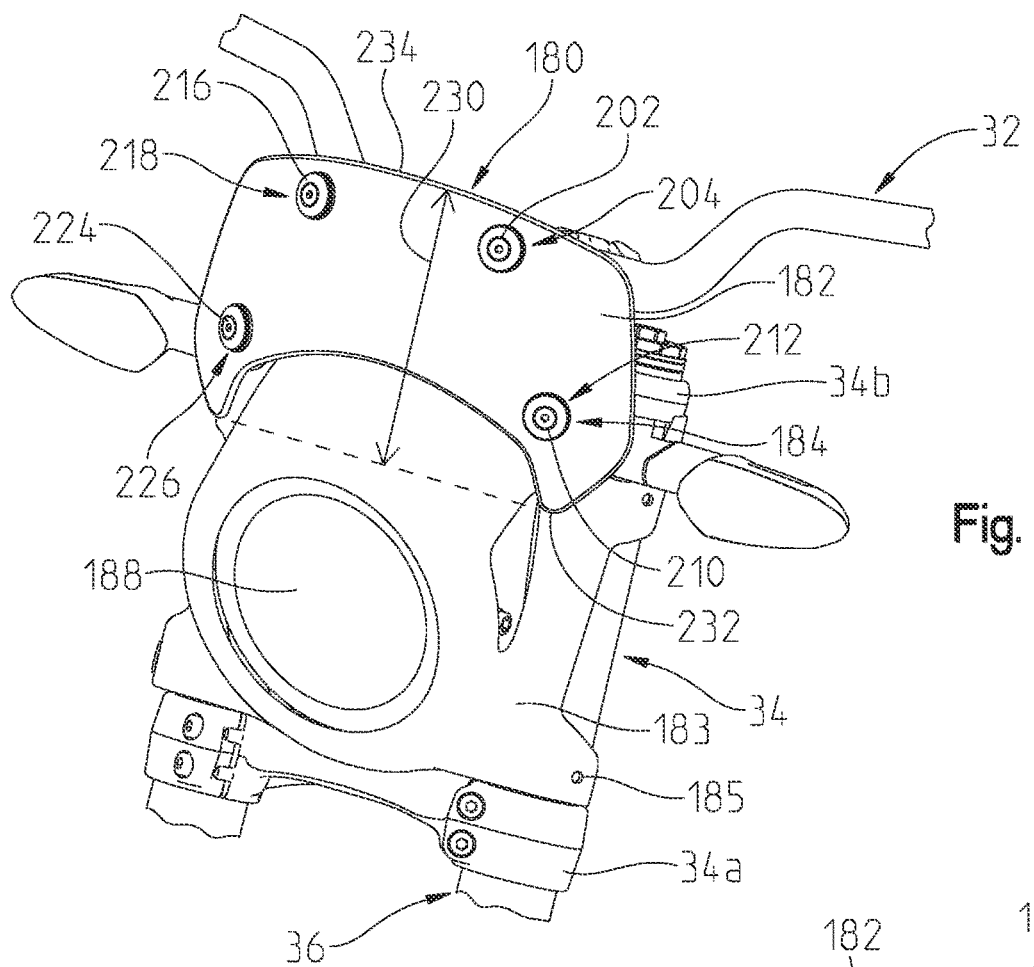
FIG. 16 is a front left perspective view of a windshield of the vehicle of FIG. 1.
Figure 17:
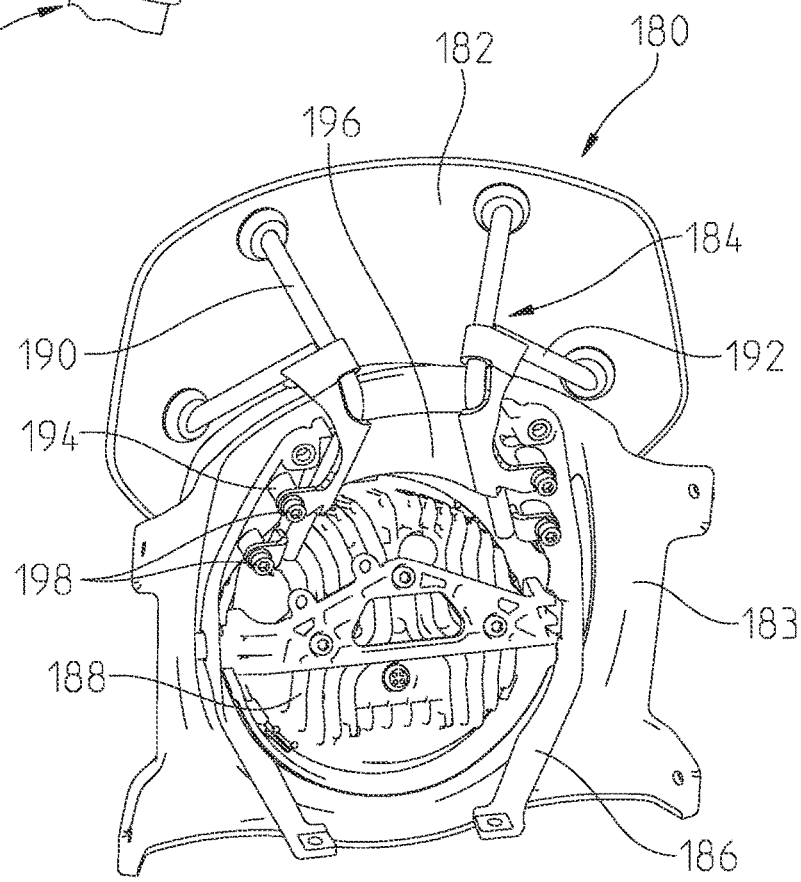
FIG. 17 is a rear perspective view of the windshield of FIG. 16.
Figure 18:
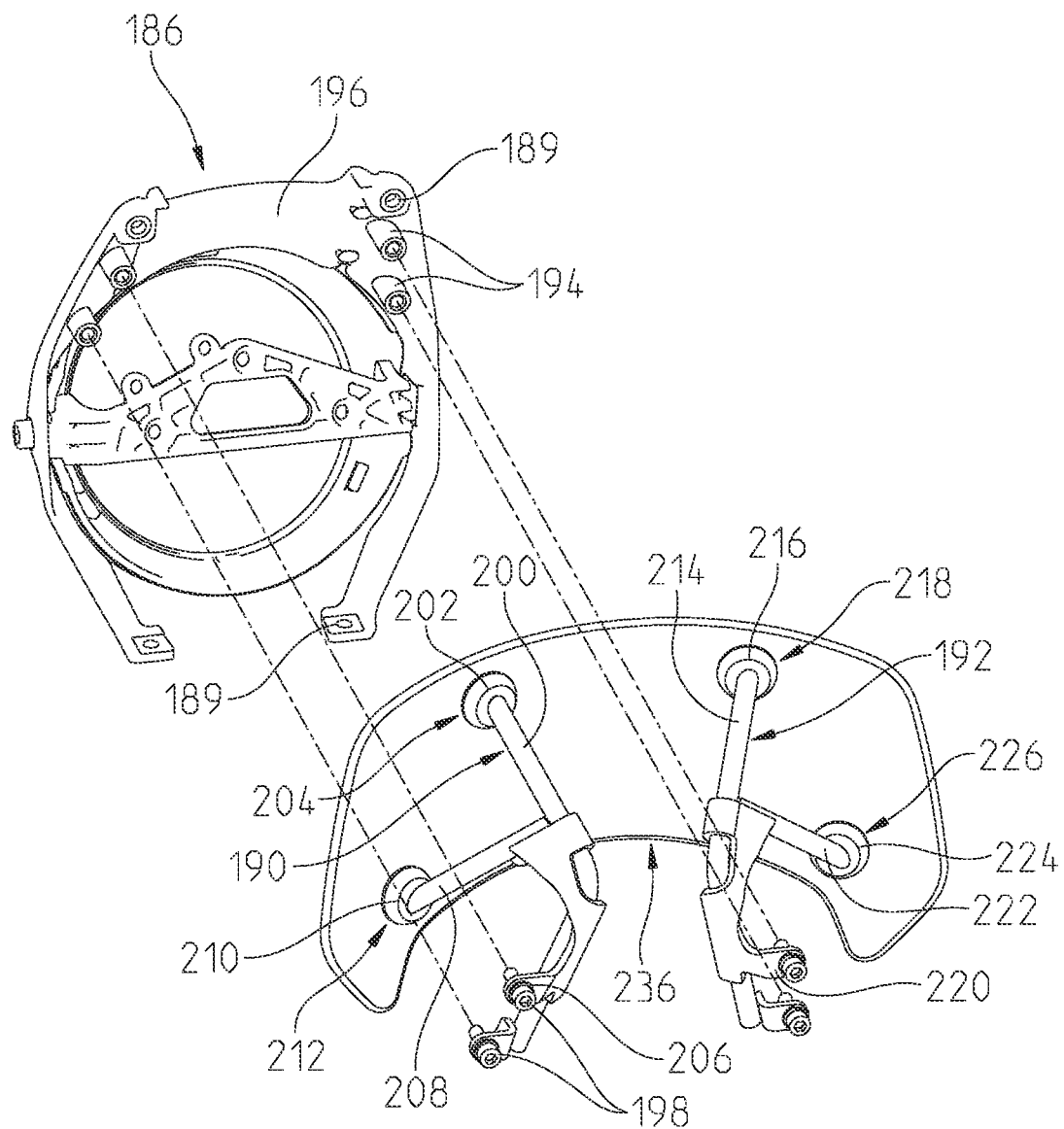
FIG. 18 is an exploded view of the windshield and a headlight mounting bracket.
Figure 19:
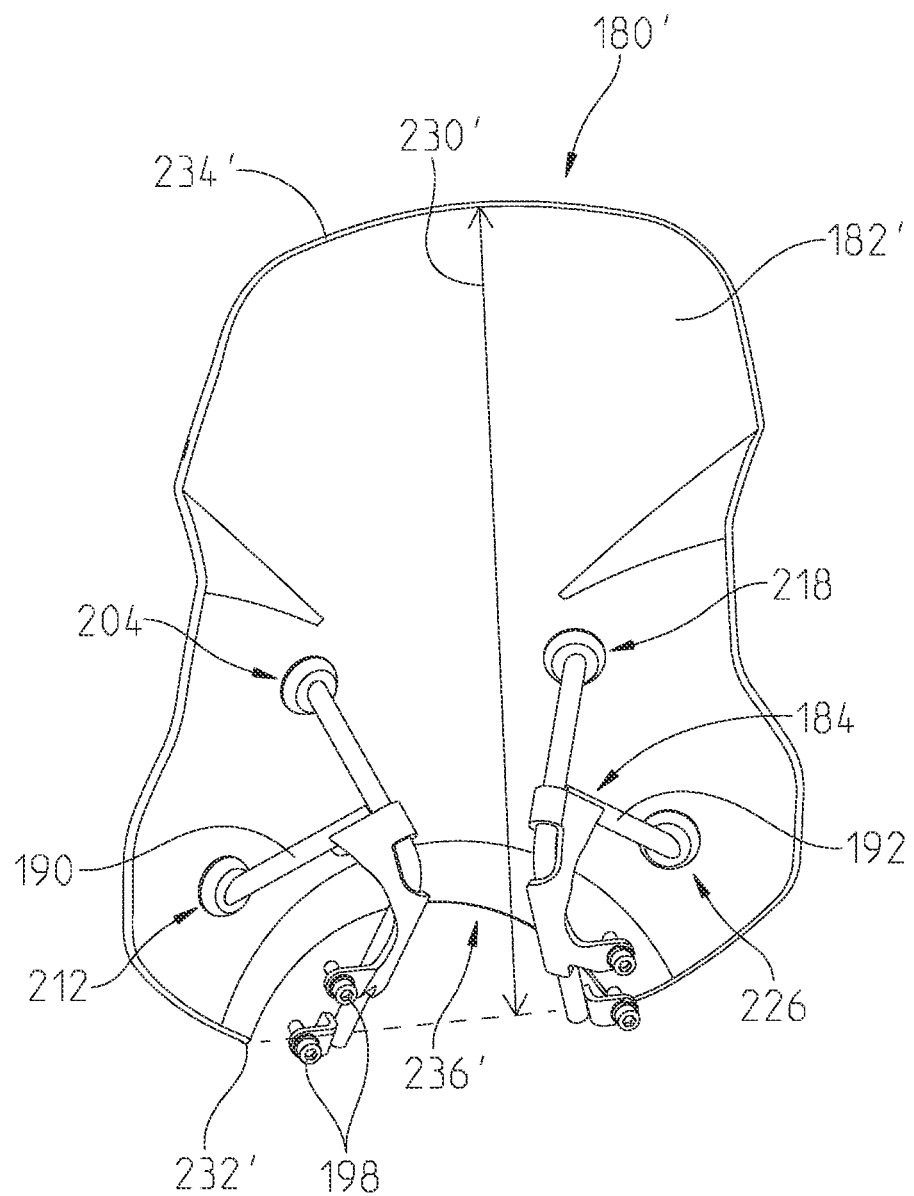
FIG. 19 is a rear perspective view of an alternative embodiment windshield of the vehicle of FIG. 1.

Referring to FIGS. 16-29, vehicle 2 is configured to support a plurality of accessories that can be removed and added to vehicle 2 at the discretion of the operator. For example, as shown in FIGS. 16-19, vehicle 2 is configured to include a windshield or wind screen 180. Vehicle 2 is configured to receive and support a plurality of windshields 180, as shown in FIGS. 16 and 19 as windshields 180 and 180', respectively. In addition to those shown in FIGS. 16 and 19, vehicle 2 may support additional configurations of windshields, such as those with larger or smaller recessed lower surfaces and those with longer or shorter vertical lengths, as disclosed further herein.

Referring still to FIGS. 16-19, windshield 180 is positioned longitudinally forward of the handlebars of steering assembly 32 and is positioned generally above triple clamp assembly 34 and front forks 36. More particularly, windshield 180 includes a wind screen portion 182, illustratively comprised of polycarbonate, and a support assembly 184 configured to couple portion 182 to vehicle 2. In one embodiment, windshield 180 is configured to be supported on a housing or carrier 186 for a headlight 188 of vehicle 2. Carrier 186 may be coupled to a nacelle or outer housing 183 which is coupled to triple clamp assembly 34 with removable fasteners 187 (FIG. 1) received through apertures 185 (FIG. 16). Nacelle 183 is configured to conceal carrier 186 and is positioned longitudinally forward thereof, however, various embodiments of vehicle 2 may not include nacelle 183.

Illustratively, support assembly 184 includes a first frame member 190 and a second frame member 192 which are configured to be removably coupled to threaded bosses 194 on a rearward side or surface 196 of carrier 186 with removable fasteners 198. First frame member 190 includes an upper arm 200 which defines a first grommet or mount 202 for coupling to a first location 204 on portion 182 of windshield 180. Upper arm 200 also includes a second mount 206 configured to receive fasteners 198 and configured to couple with threaded bosses 194 of carrier 186. First frame member 190 also includes a lower arm 208 which defines a third grommet or mount 210 for coupling to a second location 212 on portion 182 of windshield 180. Similarly, second frame member 192 includes an upper arm 214 which defines a fourth grommet or mount 216 for coupling to a third location 218 on portion 182 of windshield 180. Upper arm 214 also includes a fifth mount 220 configured to receive fasteners 198 and configured to couple with threaded bosses 194 of carrier 186. Second frame member 192 also includes a lower arm 222 which defines a sixth grommet or mount 224 for coupling to a fourth location 226 on portion 182 of windshield 180. It may be appreciated that mounts 206, 220 are bent plates which are welded to arms 200, 214, respectively, and allow fasteners 198 (e.g., screws) to be received within bosses 194 on rearward surface 196 of carrier 186. In one embodiment, bosses 194 are die cast and integral with carrier 186.

Support assembly 184 also may be used different configurations of windshield 180, such as windshield 180' of FIG. 19. As shown in FIG. 19, windshield 180' has a longer vertical length 230' than a vertical length 230 of windshield 180 of FIG. 16. Vertical length 230 of windshield 180 is defined as the length extending generally vertically between a lower surface 232 and an upper surface 234 of windshield 180 and vertical length 230' of windshield 180' is defined as the length extending generally vertically between a lower surface 232' and an upper surface 234' of windshield 180'. Lower surfaces 232, 232' of windshields 180, 180' includes a recessed portion 236, 236', respectively, which are configured to receive a portion of carrier 186 and nacelle 183. As shown in FIG. 19, recessed portion 236' of windshield 180' spans a smaller lateral extent than that of recessed portion 236 of windshield 180 of FIG. 18 but is still configured to receive a portion of carrier 186 such that various windshields may be used on vehicle 2. While windshield 180' of FIG. 19 may not be used on vehicle 2 when nacelle 183 also is used on vehicle 2, various windshield configurations may be used with or without nacelle 183 on vehicle 2. Additional windshields may include the vertical length 230 of windshield 180 with the smaller recessed portion 236' of windshield 180' or may include the vertical length 230' of windshield 180' with the larger recessed portion 236 of windshield 180. In this way, vehicle 2 is configured to support a plurality of windshields thereon.

In order to couple a windshield to vehicle 2, if vehicle 2 includes nacelle 183, then nacelle 183 is first removed from front forks 36 by removing the fasteners 187 (FIG. 1) received through apertures 185. Carrier 186 is then exposed and can be moved from triple clamp assembly 34 by removing fasteners (not shown) extending through apertures 189 at lower and upper triple clamps 34a, 34b. Headlight 188 can be unplugged and removed from vehicle 2. With headlight 188 removed, support assembly 184 is coupled to carrier 186 with fasteners 198 and bosses 194. With support assembly 184 in place, headlight 188 and carrier 186 may be reattached to vehicle 2. Nacelle 183 is then reattached to front forks 36 and portion 182 is then positioned over the upper surface of nacelle 183 and attached to support assembly 184 with grommets 202, 210, 216, 224.

Figure 20:
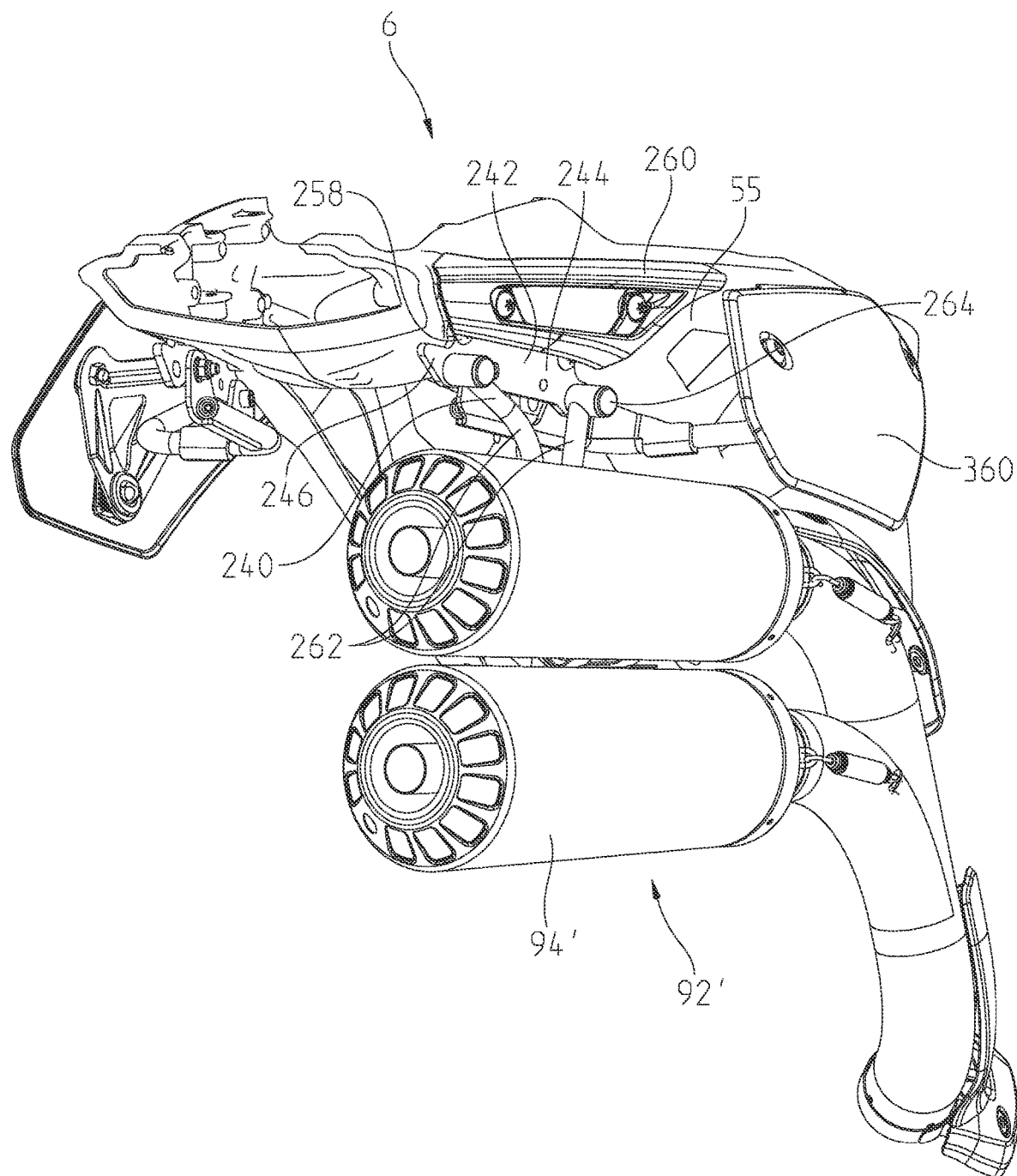
FIG. 20 is a rear right perspective view of a mounting bracket for a plurality of accessories of the vehicle of FIG. 1, including a high-mount exhaust assembly and a side number plate.
Figure 21:
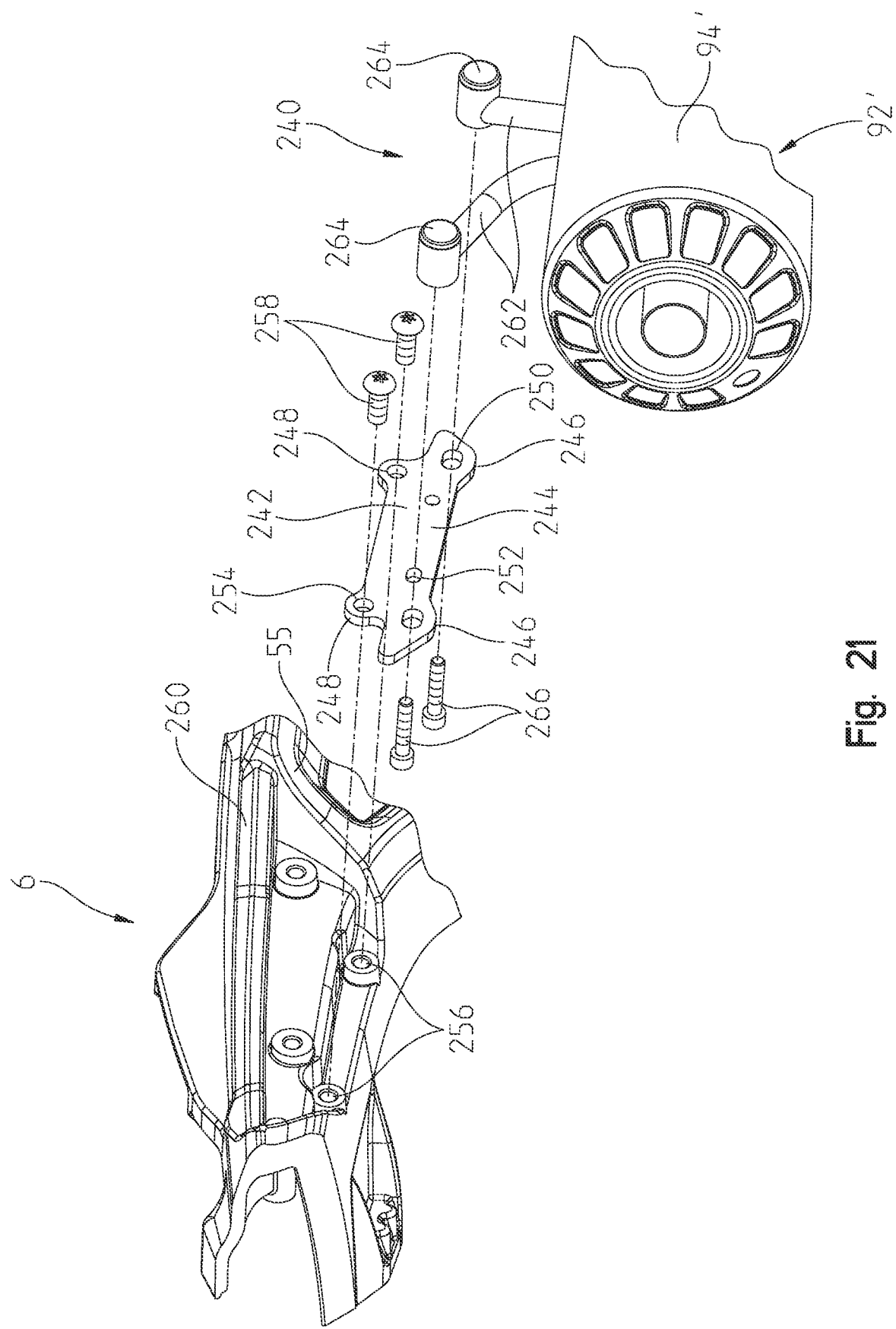
FIG. 21 is an exploded view of the mounting bracket and the high-mount exhaust of FIG. 20.

Referring to FIGS. 20 and 21, vehicle 2 is further configured to support an accessory exhaust assembly 92'. In particular, compared to exhaust assembly 92 of FIG. 5, exhaust assembly 92' of FIG. 20 may be configured as a high-mounted exhaust assembly such that muffler 94' is positioned vertically higher on vehicle 2 than muffler 94 of FIG. 5. At least muffler 94' is supported at rear end 6 of vehicle 2 with a support frame 240. Support frame 240 is coupled to subframe 55 of frame assembly 50 through a mounting bracket 242. Support frame 240 includes arms 262 with couplers 264 integrally formed therewith.

As disclosed further herein, mounting bracket 242 is configured to support a plurality of accessories at rear end 6 of vehicle 2. As shown in FIGS. 20 and 21, mounting bracket 242 may be comprised of a metallic material (e.g., sheet metal, such as coated steel) and includes a body portion 244, lower mounting tabs 246 extending from body portion 244, and upper mounting tabs 248 extending from body portion 244. Tabs 246, 248 may be integrally formed with body portion 244 and include apertures 250, 254, respectively. Additionally, body portion 244 may include additional apertures 252 positioned generally adjacent apertures 250 of lower mounting tabs 246. Mounting bracket 242 is configured to couple with subframe 55 through mounting bores or bosses 256 thereon. In particular, removable fasteners 258 are configured to extend through apertures 254 of upper mounting tabs 248 and are received within mounting bores 256 of subframe 55.

In one embodiment, mounting bracket 242 extends below a handle 260 for a passenger positioned on seat 42. Handle 260 may be removed from vehicle 2, if necessary. As shown best in FIGS. 20 and 28, handle 260 at least partially conceals fasteners 258 for improved aesthetics of vehicle 2. For example, handle 260 may be initially removed from vehicle 2, mounting bracket 242 is then coupled to subframe 55 with fasteners 258, and then handle 260 is then reattached to vehicle 2, and this order of assembly allows for handle 260 to conceal fasteners 258 to prevent any visible mounting or attachment points.

In order to support accessory exhaust assembly 92' on vehicle, couplers 264 of arms 262 align with apertures 250 of lower mounting tabs 246 and are configured to receive removable fasteners 266 therein. In this way, support frame 240 couples at least muffler 94' of accessory exhaust assembly 92' to subframe 55 through mounting bracket 242 along the right side of vehicle 2.

Figure 22:
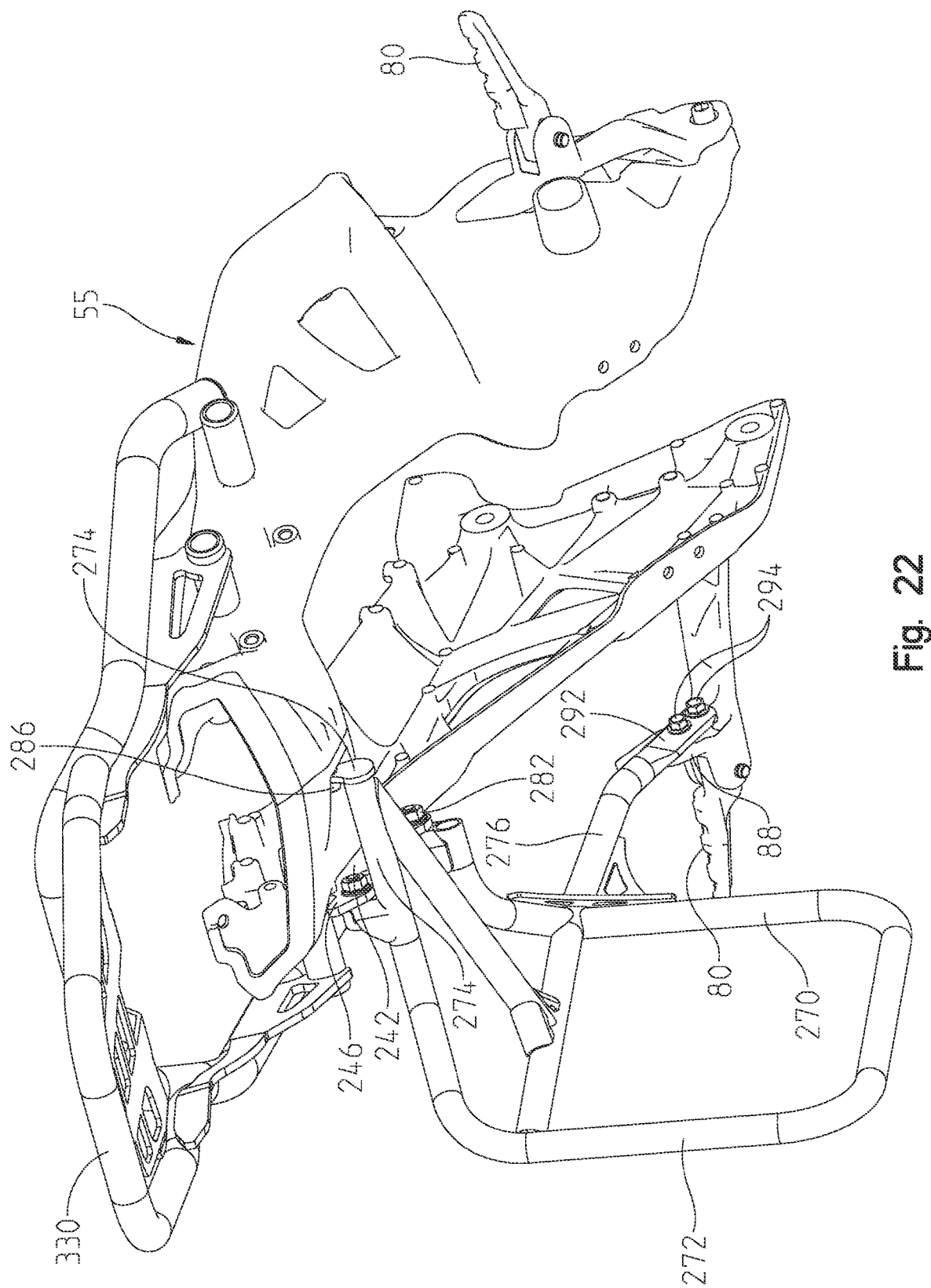
FIG. 22 is a rear right perspective view of the mounting bracket of FIG. 20 and a saddlebag support member.
Figure 23:
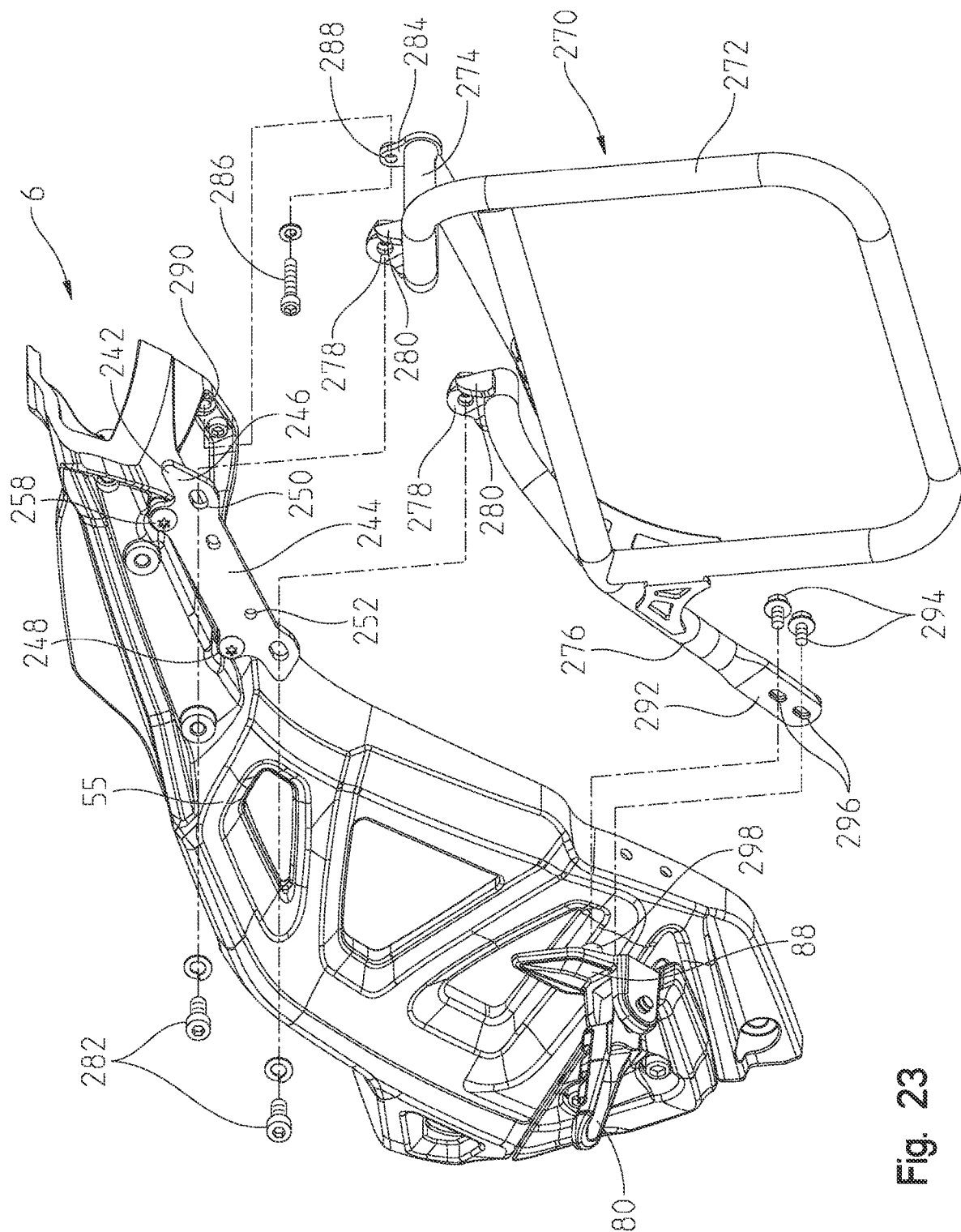
FIG. 23 is an exploded view of the mounting bracket and the saddlebag support member of FIG. 22.

Referring to FIGS. 22 and 23, mounting bracket 242 also is configured to support other accessories, such as a saddlebag frame 270, on subframe 55. In one embodiment, mounting bracket 242 on the left side of vehicle 2 may support saddlebag frame 270 while mounting bracket 242 on the right side of vehicle 2 supports other accessories, such as accessory exhaust assembly 92'. In this way, mounting bracket 242 is configured to simultaneously support a plurality of accessories on vehicle 2. Alternatively, mounting brackets 242 on both the right and left sides of vehicle 2 may each couple with saddlebag frames 270.

As shown in FIGS. 22 and 23, saddlebag frame 270 includes a main portion 272 configured to receive a saddlebag, a first support arm 274, and a second support arm 276. Main portion 272 includes mounting tabs 278, each with an aperture 280 configured to receive a removable fastener 282. Saddlebag frame 270 is further coupled to frame assembly 50 through a mounting tab 284 of first support arm 274 such that a removable fastener 286 is received through an aperture 288 of mounting tab 284 to couple first support arm 274 to a mounting bore 290 of subframe 55. Additionally, saddlebag frame 270 is further coupled to frame assembly 50 through a mounting tab 292 of second support arm 276 such that a removable fastener 294 is received through an aperture 296 of mounting tab 292 to couple second support arm 276 to a mounting bore 298 of rearward mounting portion 88 of foot peg 80.

Figure 24:
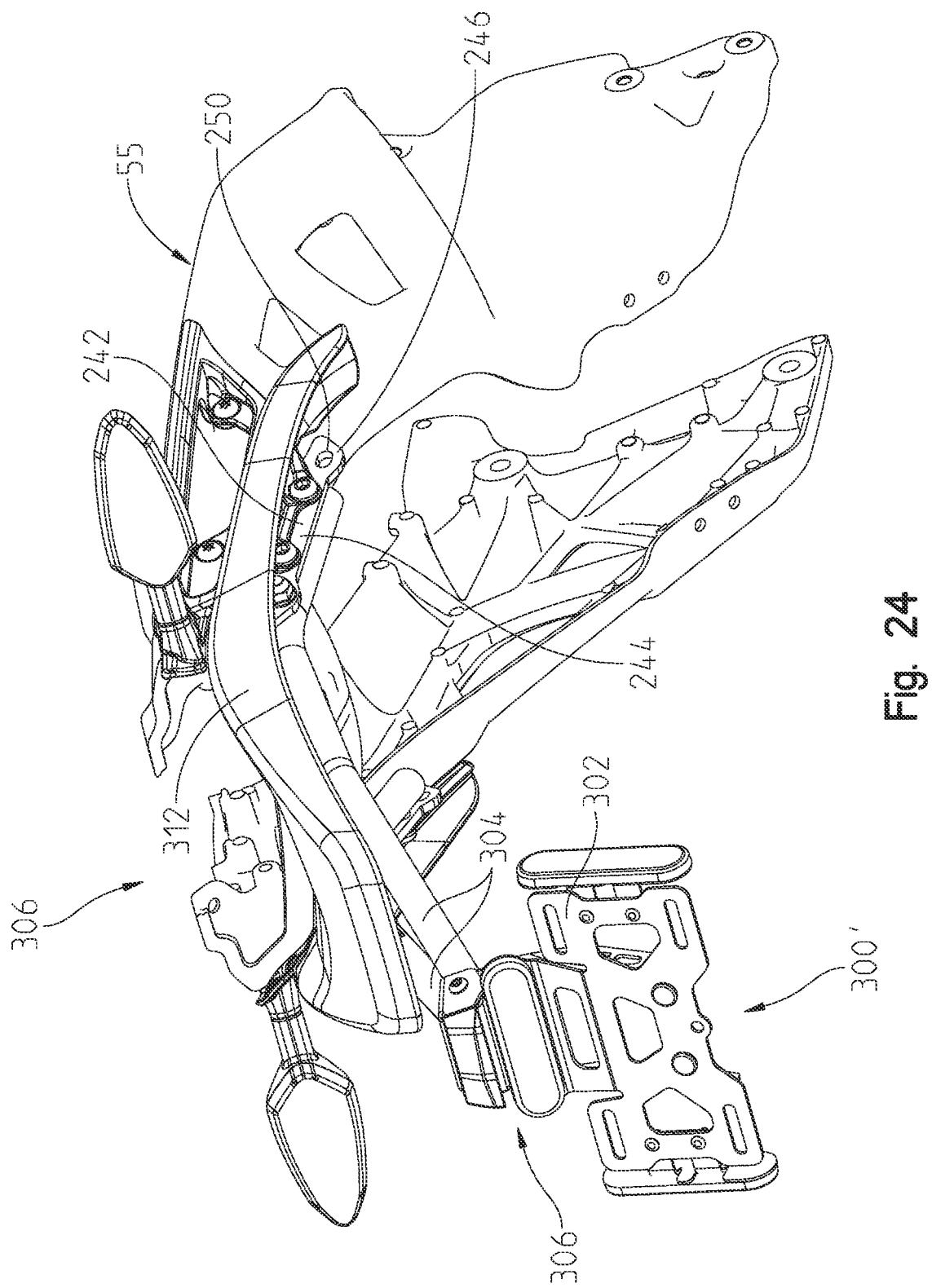
FIG. 24 is a rear right perspective view of a high license plate holder coupled to the mounting bracket of FIG. 20.
Figure 25:
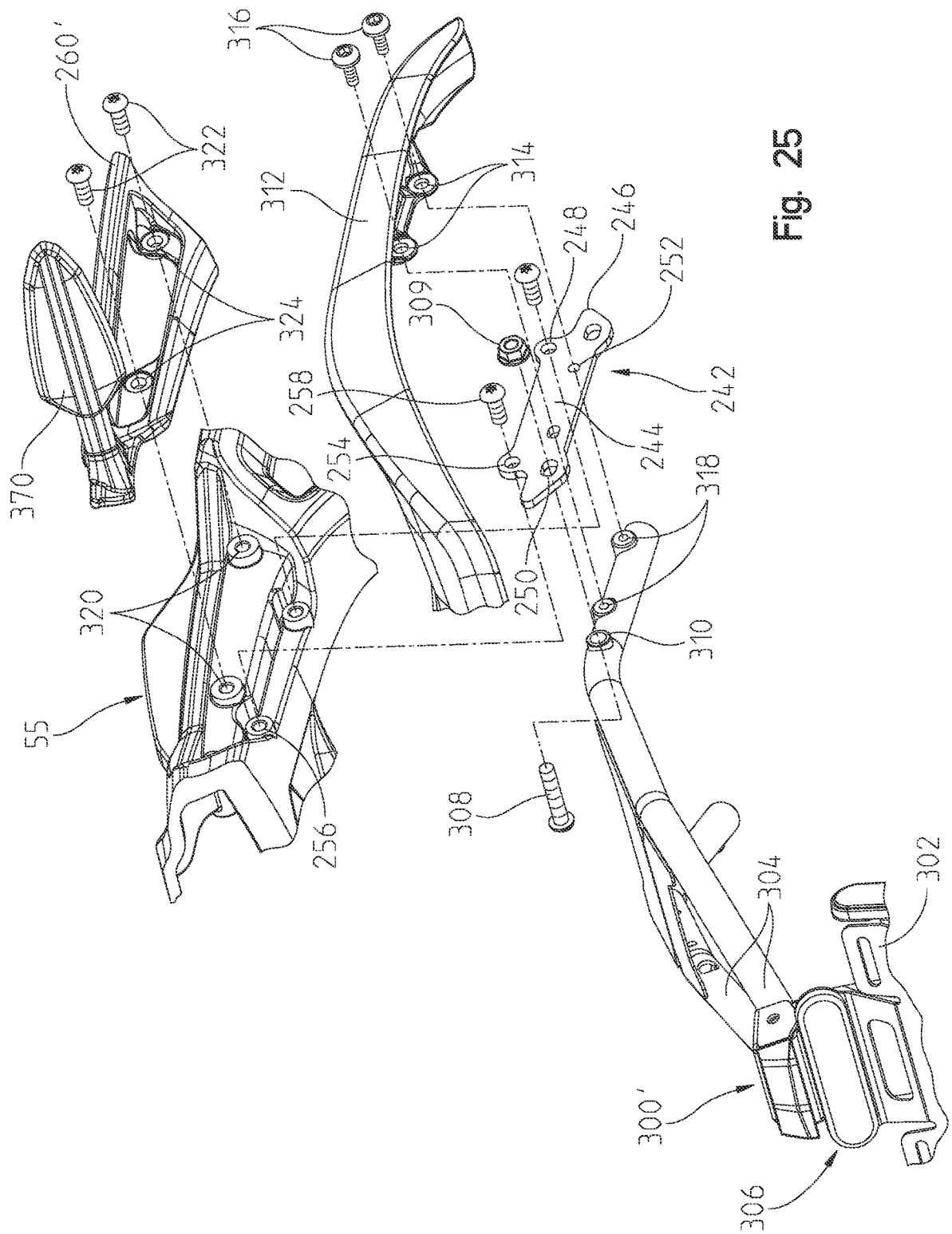
FIG. 25 is an exploded view of the license plate holder and the mounting bracket of FIG. 24.

Referring to FIGS. 24 and 25, vehicle 2 is further configured to support an accessory license plate holder 300'. A license plate holder 300 (FIG. 1) may be supported on vehicle 2 at a position lower than that of accessory license plate holder 300' (FIGS. 24 and 25), thereby making accessory license plate holder 300' a high-mounted license plate holder. Again, mounting bracket 242 may be used to couple accessory license plate holder 300' to subframe 55.

More particularly, accessory license plate holder 300' includes a license plate portion 302, a support frame 304, and other components 306, such as an accessory light. Support frame 304 is coupled to mounting bracket 242 through fasteners 308, 309 which are received at a mounting bore 310 on support frame 304 and aperture 250 of mounting bracket 242.

Mounting bracket 242 further couples a fender and/or mud guard 312 to subframe 55 and support frame 304 of accessory license plate holder 300'. Fender 312 includes mounting bores 314 which are configured to receive removable fasteners 316. Fasteners 316 extend through mounting bores 314 on fender 312, through apertures 252 on mounting bracket 242, and are received into mounting bores 318 on support frame 304.

Mounting bracket 242 itself is coupled to mounting bores 256 on subframe 55 with fasteners 258 which extend through apertures 254 on mounting tabs 248. Mounting bores 256 on subframe 55 are positioned below threaded bosses 320, where threaded bosses 320 are configured to receive removable fasteners 322 to couple handle 260 to vehicle 2. More particularly, fasteners 322 are received through mounting bores 324 on an alternative handle 260' and extend into threaded bosses 320 to allow handle 260 for the passenger to be coupled to subframe 55. When coupling accessory license plate holder 300' and fender 312 to subframe 55, mounting bracket 242 and handle 260' may remain on vehicle 2 and support frame 304 is coupled to a laterally inner side of mounting bracket 242 while fender 312 is coupled to a laterally outer side of mounting bracket 242. It may be necessary to couple fender 312 to vehicle 2 after handle 260' has been coupled thereto because a portion of fender 312 may conceal a lower portion of handle 260 when attached to vehicle 2. As shown in FIG. 25, handle 260' is different from handle 260 because handle 260' includes a turn signal 370.

Figure 26:
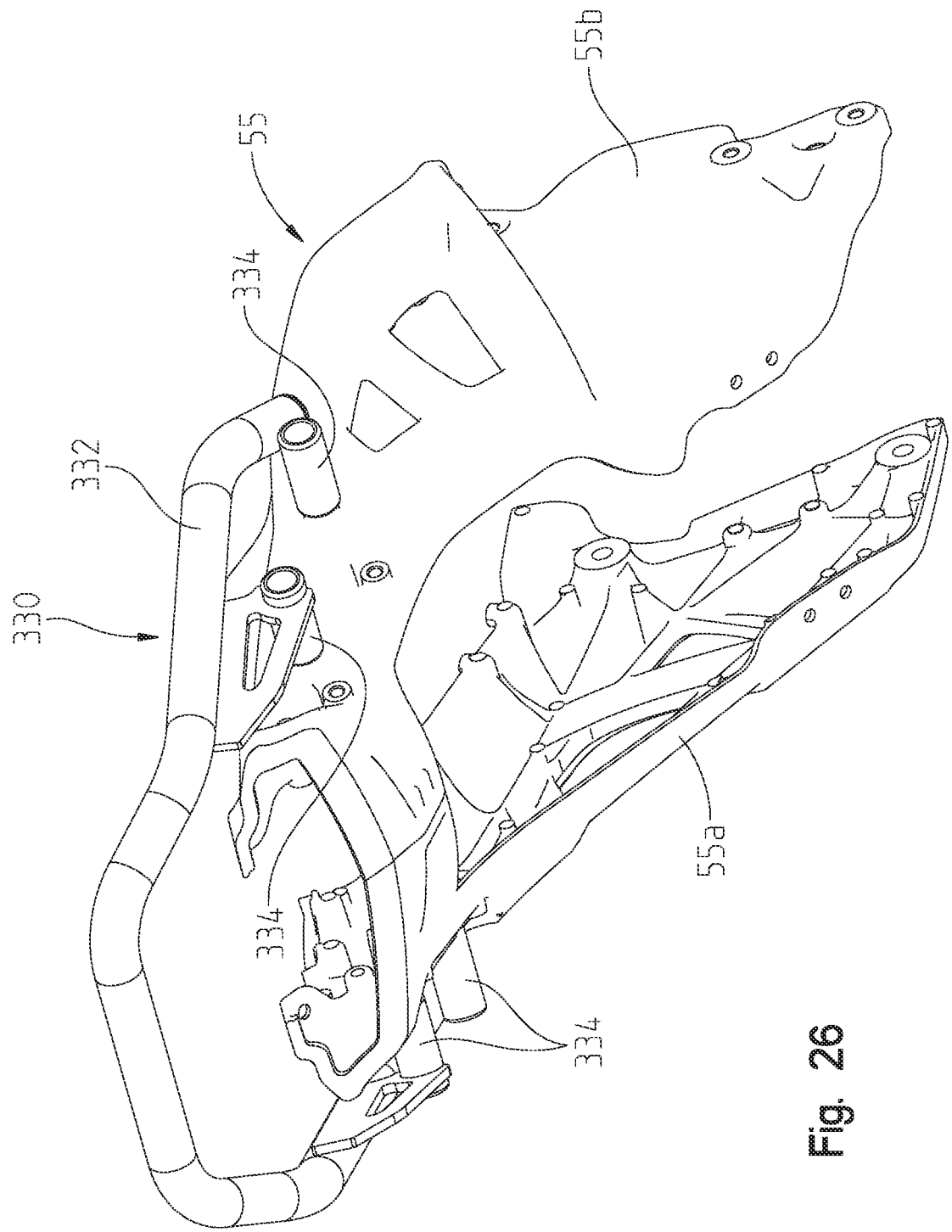
FIG. 26 is a rear right perspective view of a luggage rack coupled to the vehicle of FIG. 1.
Figure 27:
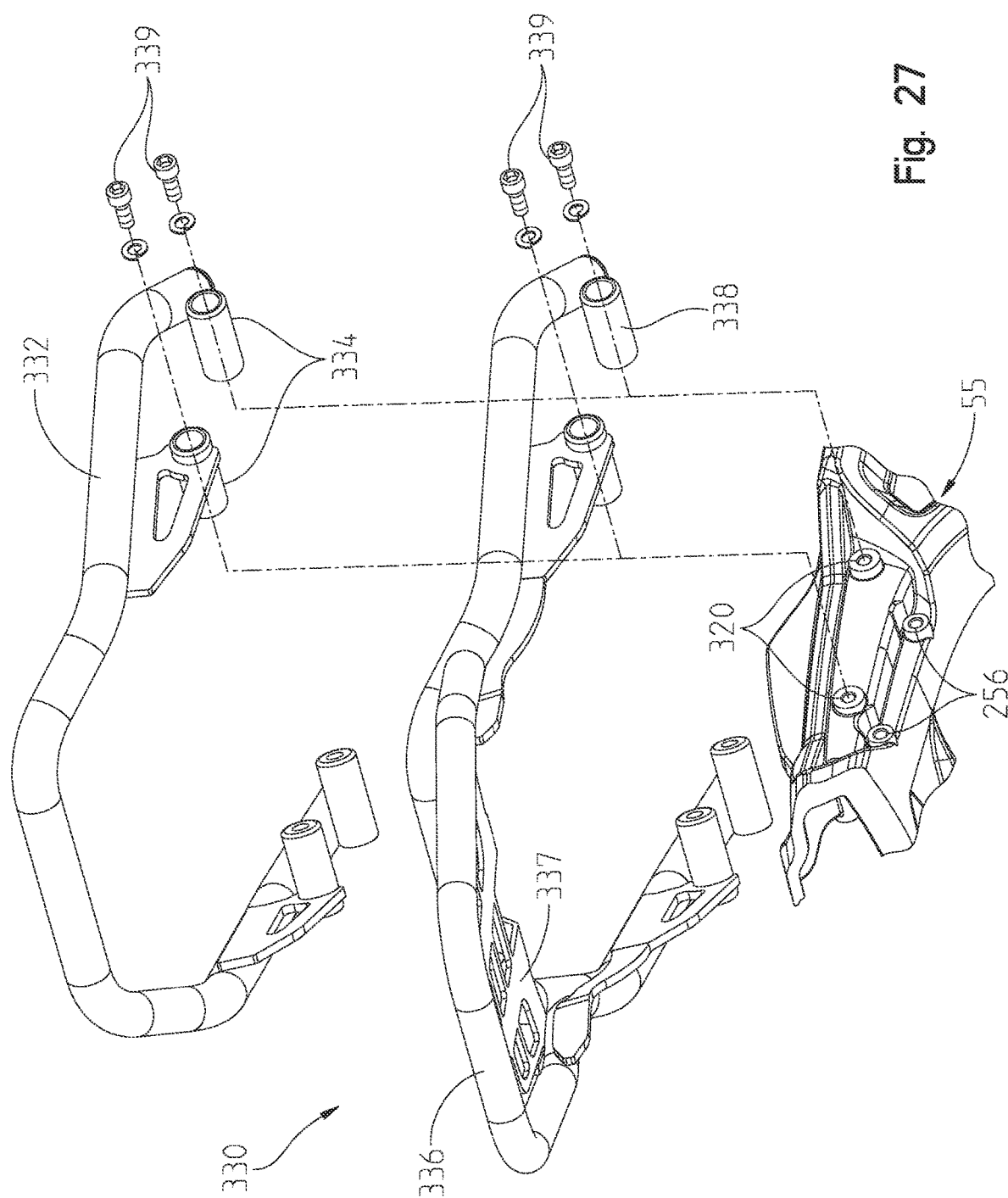
FIG. 27 is an exploded view of the luggage rack of FIG. 26.

Referring to FIGS. 26 and 27, vehicle 2 also may be configured to support a luggage or cargo rack 330 on vehicle 2. Illustratively, luggage rack assembly 330 may be defined by a first luggage rack 332 having couplers 334 for mounting to subframe 55 or, alternatively, may be defined by a second luggage rack 336 having couplers 338 for mounting to subframe 55. As shown in FIG. 27, second luggage rack 336 may include a platform 337 for securing cargo thereto. In one embodiment, first luggage rack 332 may be coupled to vehicle 2 when saddlebag frame 270 also is used. However, first and second luggage racks 332, 336 may be used with additional components and accessories of vehicle 2. Removable fasteners 339 may be used to couple first or second luggage racks 332, 336 to threaded bosses 320 of subframe 55. It may be appreciated that passenger handle 260 is removed from vehicle 2 when luggage racks 332 or 336 are coupled to subframe 55, however, luggage racks 332, 336 may be used as a passenger handle in addition to supporting cargo thereon.

Figure 28:
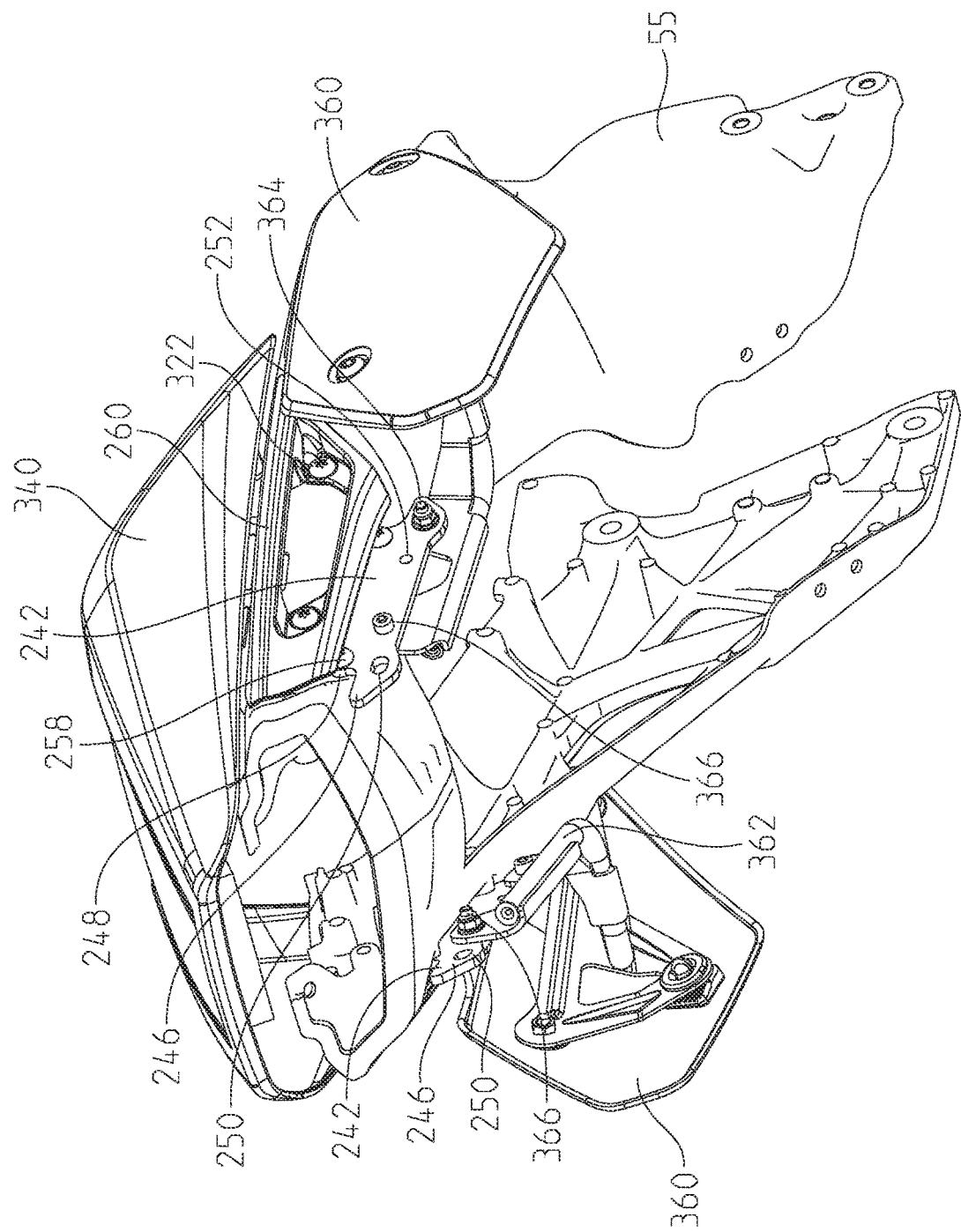
FIG. 28 is a rear right perspective view of a seat cowl and the mounting bracket of FIG. 20.
Figure 29:
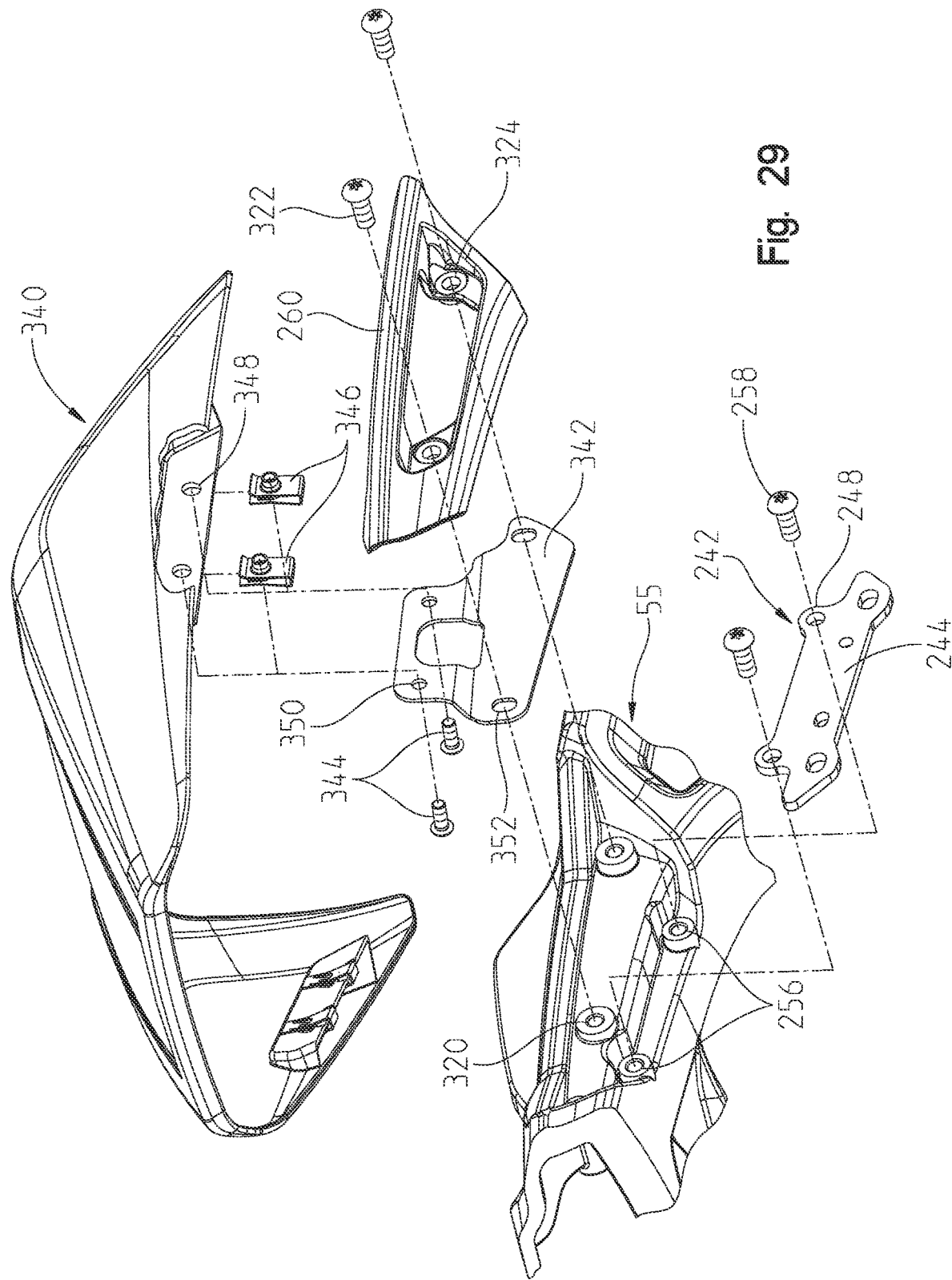
FIG. 29 is an exploded view of the seat cowl and the mounting bracket of FIG. 28.

Referring to FIGS. 28 and 29, vehicle 2 also may support an accessory seat cowl 340. Seat cowl 340 is positioned rearward of at least an operator portion of seat 42 (FIG. 1) and may be positioned over a passenger portion of seat 42. Seat cowl 340 also is coupled to a portion of subframe 55 through a plate 342. More particularly, plate 342 is coupled to seat cowl 340 with removable fasteners 344 which are received through apertures 350 on plate 342 and also are received through couplers 346 and apertures 348 of seat cowl 340. Plate 342 also is coupled to handle 260, 260' with fasteners 322 which are received through apertures 352 of plate 342 and are received within threaded bosses 320 of subframe 55. In this way, seat cowl 340 and handle 260 are coupled together through plate 342. In order to attach seat cowl 340 to vehicle 2, handle 260 may first be removed, seat cowl 340 coupled to vehicle 2, and then handle 260 reattached to vehicle 2.

As shown in FIGS. 28 and 29, seat cowl 340 is positioned above mounting bracket 242, thereby leaving mounting bracket 242 available for coupling with another accessory for vehicle 2 such that the operator can simultaneously use seat cowl 340 and additional accessories. For example, as shown in FIG. 28, vehicle 2 also is configured to support side number plates 360. Side number plate 360 may be used to identify a racing number or other such indicia and is mounted to subframe 55 through mounting bracket 242 and a frame assembly 362. In one embodiment, frame assembly 362 is coupled to mounting bracket 242 with removable fasteners 364, 366 which are received through apertures 250, 252 of mounting bracket 242, respectively. Side number plate 360 may be coupled to vehicle with seat cowl 340 or other accessories, such as accessory exhaust assembly 92', as shown in FIG. 20, or high license plate holder 300' (FIG. 24).

As disclosed herein, mounting bracket 242 is configured to simultaneously and individually couple with a plurality of accessories for vehicle 2. More particularly, mounting bracket 242 allows various accessories to be coupled to both the laterally inner and the laterally outer sides thereof and includes a plurality of dedicated accessory apertures 250, 252 such that a plurality of accessories may be simultaneously coupled to vehicle 2 through mounting bracket 242. Various accessories may be coupled to mounting bracket through the dedicated accessory apertures 250, 252 while handle 260 or other vehicle components or accessories may be coupled to subframe 55 through bosses 320 positioned above mounting bracket 242. Additionally, because at least handle 260 conceals at least fasteners 258, the mounting points for mounting bracket 242 are hidden from an outside view of vehicle 2, thereby improving the aesthetics of vehicle 2.

The list of accessories disclosed herein, such as windshields 180, 180'; high exhaust assembly 92'; saddlebag frame 270; high license plate holder 300'; fender 312; luggage racks 32, 336; seat cowl 340; handle 260'; and side number plates 360, do not define an exhaustive list of accessories that may be accommodated on vehicle 2. For example, additional accessories, such as accessory seats, lights, and/or other components, may be supported on vehicle 2.

Additional details of vehicle 2 may be disclosed in U.S. patent application Ser. No. 15/911,343, filed on Mar. 5, 2018, and entitled "TWO-WHEELED VEHICLE," the complete disclosure of which is expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A two-wheeled vehicle, comprising:
 a frame assembly having a front end and a rear end extending along a longitudinally-extending centerline;
 a front ground-engaging member operably coupled to the front end of the frame assembly at a front rotational axis;
 a rear ground-engaging member operably coupled to the rear end of the frame assembly at a rear rotational axis;
 a steering assembly operably coupled to the front ground-engaging member, the steering assembly including a handlebar and front forks;
 a headlight assembly including a carrier supported by the steering assembly;
 a triple clamp assembly coupled to the front forks; and
 a windshield positioned longitudinally forward of the handlebar, the windshield including a support assembly coupled to the carrier of the headlight assembly.

2. The two-wheeled vehicle of claim 1, wherein the headlight assembly further includes an outer housing coupled to the triple clamp assembly and positioned longitudinally forward of the carrier.

3. The two-wheeled vehicle of claim 1, wherein the support assembly includes a first frame member and a second frame member configured to be removably coupled to the rearward side of the carrier.

4. The two-wheeled vehicle of claim 3, wherein the first frame member includes an upper arm includes a mount configured to be coupled to a first location on a windscreen of the windshield assembly.

5. The two-wheeled vehicle of claim 4, wherein the upper arm includes a second mount configured to be coupled to the carrier.

6. The two-wheeled vehicle of claim 5, wherein the first frame member includes a lower arm defining a third mount configured to be coupled to a second location on the windscreen of the windshield assembly.

7. The two-wheeled vehicle of claim 6, wherein the second frame member includes an upper arm includes a fourth mount configured to be coupled to a third location on the windscreen of the windshield assembly.

8. The two-wheeled vehicle of claim 7, wherein the upper arm includes a fifth mount configured to be coupled to the carrier.

9. The two-wheeled vehicle of claim 8, wherein the second frame member includes a lower arm defining a sixth mount configured to be coupled to a second location on the windscreen of the windshield assembly.

10. The two-wheeled vehicle of claim 2, wherein outer housing is outer housing is removably coupled to the front forks.

11. The two-wheeled vehicle of claim 10, wherein the carrier is positioned rearward of the outer housing such that the carrier is accessible when the outer housing is removed.

12. The two-wheeled vehicle of claim 11, wherein the carrier is removable coupled to the triple clamp.

13. The two-wheeled vehicle of claim 12, wherein the headlight is accessible when the carrier is removed.

* * * * *